United States Patent
Landa et al.

(10) Patent No.: US 11,384,617 B2
(45) Date of Patent: Jul. 12, 2022

(54) SUBSEA ACTUATOR AND METHOD OF ACTUATING A SUBSEA ACTUATOR

(71) Applicant: FMC Kongsberg Subsea AS, Kongsberg (NO)

(72) Inventors: Simen Landa, Oslo (NO); Heyn Halfdan Magnus, Kongsberg (NO); Stig Fredrik Mathisen, Kongsberg (NO); Espen Rinde Brauti, Ulefoss (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 207 days.

(21) Appl. No.: 16/772,761

(22) PCT Filed: Dec. 12, 2018

(86) PCT No.: PCT/EP2018/084477
§ 371 (c)(1),
(2) Date: Jun. 12, 2020

(87) PCT Pub. No.: WO2019/115584
PCT Pub. Date: Jun. 20, 2019

(65) Prior Publication Data
US 2020/0347690 A1 Nov. 5, 2020

(30) Foreign Application Priority Data
Dec. 12, 2017 (NO) .................................. 20171985

(51) Int. Cl.
*E21B 33/035* (2006.01)
*F16K 31/00* (2006.01)
*F16K 31/04* (2006.01)

(52) U.S. Cl.
CPC ........ *E21B 33/0355* (2013.01); *F16K 31/007* (2013.01); *F16K 31/047* (2013.01)

(58) Field of Classification Search
CPC ... E21B 33/0355; F16K 31/047; F16K 31/007
See application file for complete search history.

(56) References Cited

U.S. PATENT DOCUMENTS 2,445,658 A * 7/1948 Bishofberger ........... G05D 3/12
318/366
3,416,566 A * 12/1968 Anderson ............. E21B 34/066
74/625

(Continued)

FOREIGN PATENT DOCUMENTS

| WO | WO 01/14775 A1 | 3/2001 |
| WO | WO 2006/071124 A1 | 7/2006 |

*Primary Examiner* — Aaron L Lembo

(57) ABSTRACT

The following invention relates to a subsea actuator (16'; 16") for actuating a subsea rotating component (81; 181); comprising: a first biasing element (82; 182); a motor (85; 185); a holding element (83; 100, 183) configured to receive an input force; a rotatable stem (80', 80"', 250, 84; 80; 200) operatively connectable to the component; a force transmitting arrangement (84, 80', 80"; 83, 84; 183', 195, 201; 84, 99, 86, 101, 83) connectable to the first biasing element (82; 182) and the holding element (83; 100, 183); a first connection which in a first mode is configured to lock the stem (80', 80", 250, 84; 80; 200) in a rotatable engagement with the motor (85; 185) and in a second mode is configured to unlock the stem (80', 80", 250, 84; 80; 200) from the rotatable engagement with the motor (85; 185) and allow the stem (80', 80", 250, 84; 80; 200) to be influenced by the first biasing element (82; 182); wherein the first biasing element (82; 182) and the stem (80', 80", 250, 84; 80; 200) are releasably connected via the force transmitting arrangement (84, 80', 80"; 83, 84; 183', 195, 201; 84, 99, 86, 101, 83), such that when the first biasing element (82; 182) and the stem (80', 80", 250, 84; 80; 200) are released from each other, the first biasing element (82; 182) is configured to be (Continued)

pre-tensioned to a position representing a first pre-tensioned position of the actuator (16'; 16") without operating the stem (80', 80", 250, 84; 80; 200); the holding element (83; 100, 183) is configured to exert a holding force on the force transmitting arrangement (84, 80', 80"; 83, 84; 183', 195, 201) and the first biasing element (82; 182) in the first pre-tensioned position; and wherein, when the first biasing element (82; 182) and the stem (80', 80", 250, 84; 80; 200) are connected and the first biasing element (82; 182) is pre-tensioned, the first connection is in the first mode such that the motor (85; 185) is configured to operate the stem (80', 80", 250, 84; 80; 200) to a position representing a second pre-tensioned position of the actuator (16'; 16"); wherein, in the second pre-tensioned position, upon loss of input force to the holding element (83; 100, 183), the holding element (83; 100, 183) is configured to release its holding force on the force transmitting arrangement (84, 80', 80"; 83, 84; 183', 195, 201; 84, 99, 86, 101, 83) and the first biasing element (82; 182), thereby the first connection is unlocked to its second mode, such that the pre-tensioned first biasing element (82; 182) is released and rotates the stent (80', 80", 250, 84; 80; 200) to a position representing a release position of the actuator (16'; 16").

16 Claims, 19 Drawing Sheets

(56) References Cited

U.S. PATENT DOCUMENTS

| | | | | |
|---|---|---|---|---|
| 3,865,142 | A * | 2/1975 | Begun | E21B 34/04 137/557 |
| 4,090,589 | A | 5/1978 | Fitzwater | |
| 4,378,848 | A * | 4/1983 | Milberger | E21B 33/0355 166/368 |
| 5,195,721 | A | 3/1993 | Akkerman | |
| 5,865,272 | A * | 2/1999 | Wiggins | F16K 31/047 74/89.31 |
| 6,397,948 | B1 * | 6/2002 | Williams | E21B 33/038 114/221 A |
| 6,595,487 | B2 * | 7/2003 | Johansen | E21B 33/0355 251/129.04 |
| 7,143,993 | B2 * | 12/2006 | Everingham | F02M 26/54 123/568.24 |
| 8,596,608 | B2 * | 12/2013 | Grimseth | E21B 33/0355 251/74 |
| 8,973,451 | B2 * | 3/2015 | Oswald | F16H 25/205 251/71 |
| 10,164,430 | B2 * | 12/2018 | Strømsvik | H02J 3/00 |
| 2020/0158251 | A1 * | 5/2020 | Vanryckeghem | E21B 34/02 |

* cited by examiner

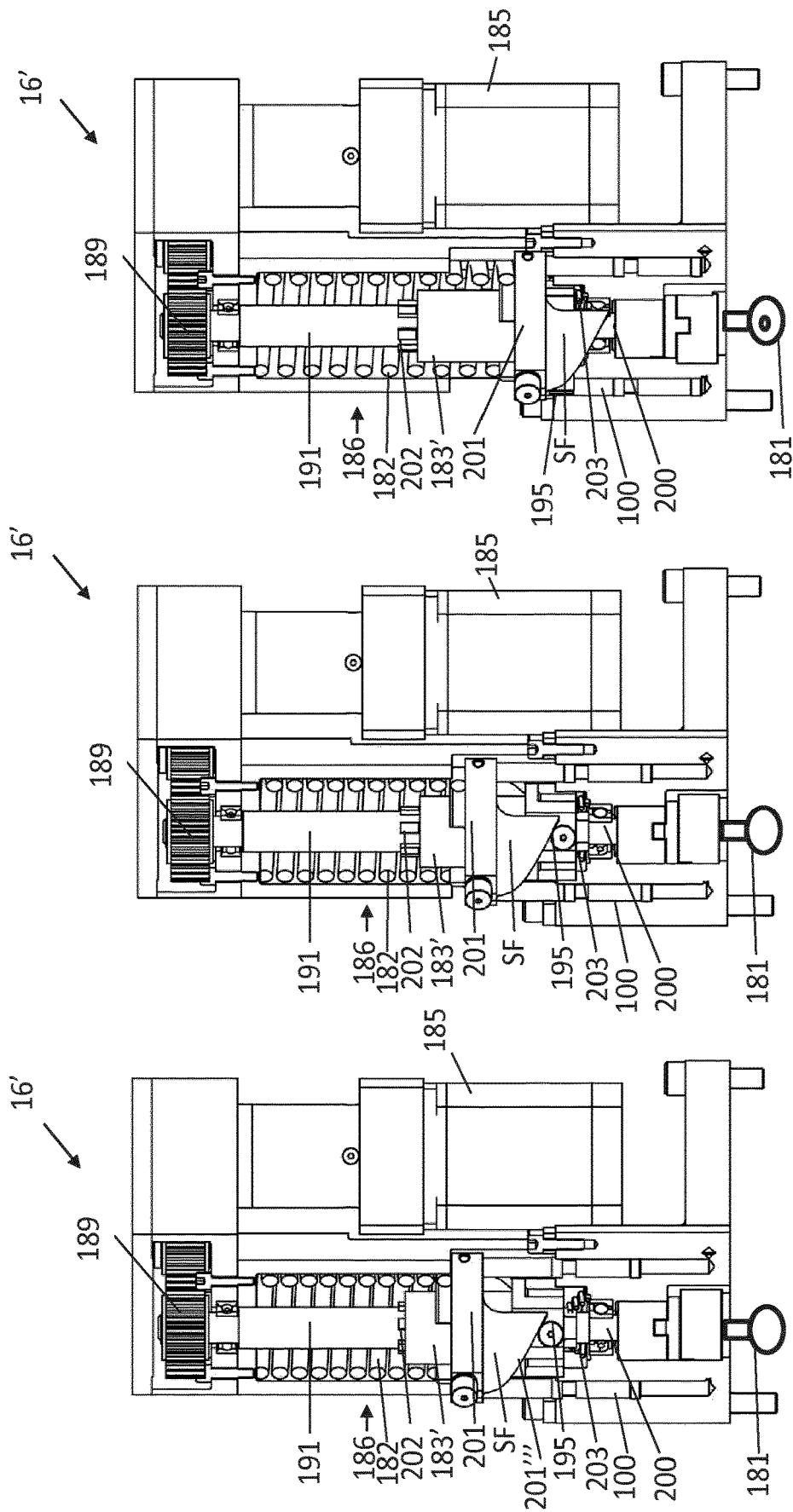

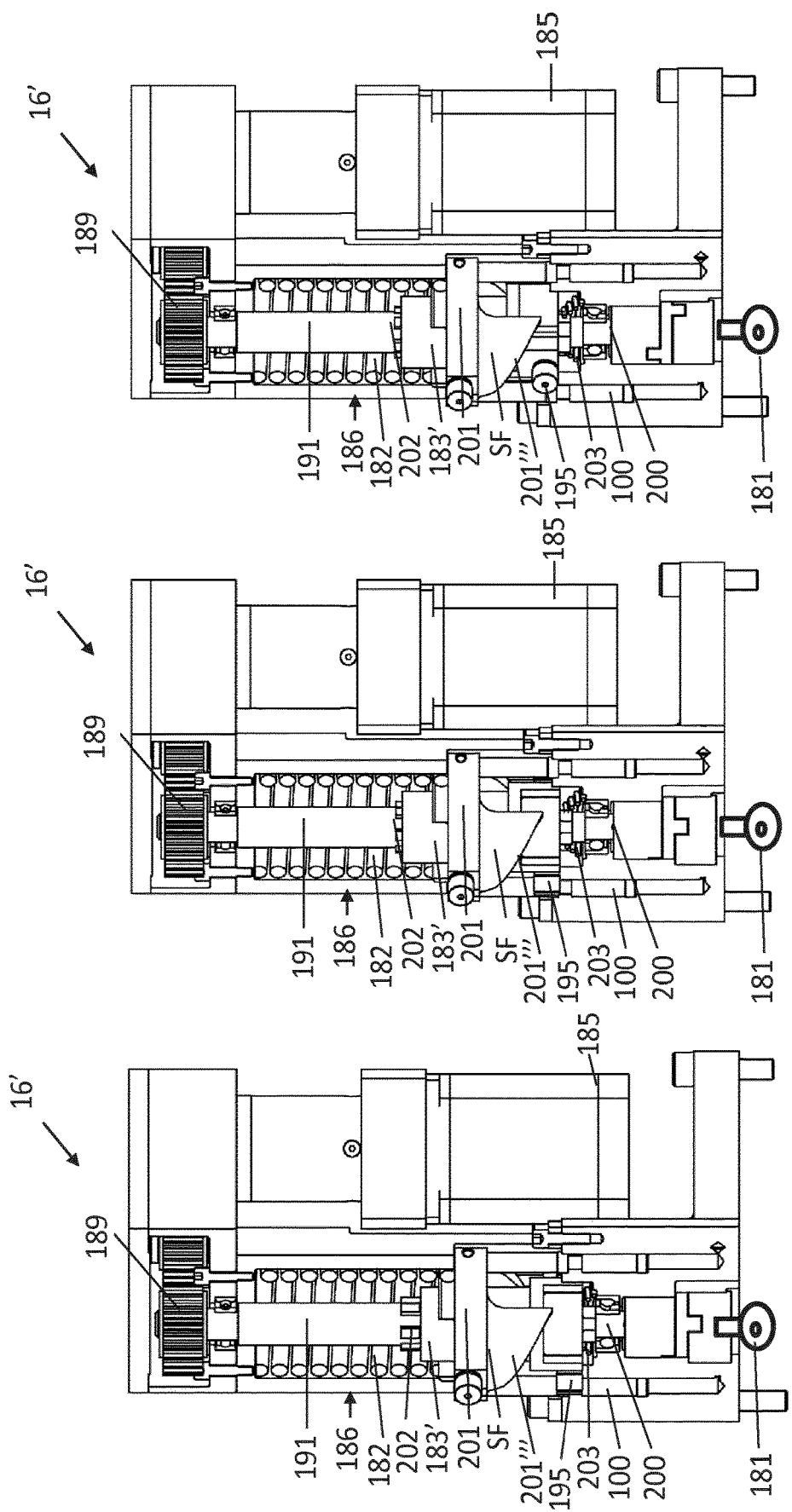

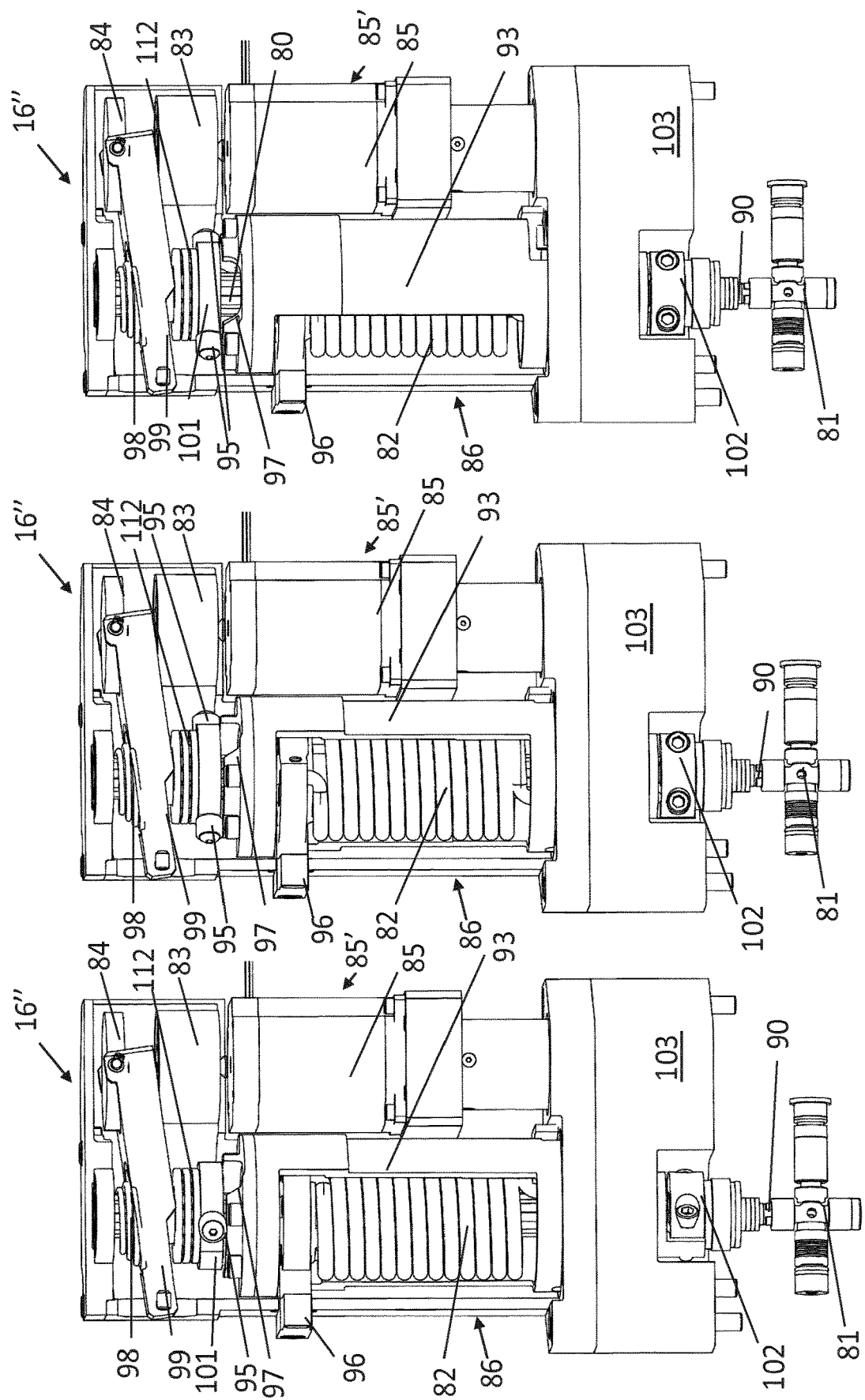

SUBSEA ACTUATOR AND METHOD OF ACTUATING A SUBSEA ACTUATOR

The following invention relates to a subsea actuator for actuating a subsea rotating component, as well as a method of actuating an actuator.

BACKGROUND OF THE INVENTION

The production from a subsea well is controlled by a number of valves that is assembled into a Christmas tree. The actuation of the valves is normally dependent upon hydraulic fluid to operate hydraulic actuators for the valves and is therefore entirely dependent upon an external source for the supply of hydraulic fluid. Hydraulic power is normally supplied through an umbilical running from a station located on a vessel on the surface or, less common, from a land based station. There is now also coming Subsea Hydraulic Power Units—for supply of hydraulic/electric power. Usually the actuators are controlled by pilot valves housed in a control module located at or near the subsea installation, the pilot valves directing the supply of fluid to each actuator, as dictated by the need for operation. The pilot valves may be operated by electric means and such a system is therefore called an electro-hydraulic system.

Different types of subsea modules are used in subsea oil/gas installations. In FIG. 1, a part of a subsea oil/gas installation 1 is shown, with one typical subsea module 2 is the Christmas tree connected to a well head (not shown) of an oil/gas well. In FIG. 1, it is shown that the Christmas tree is connected to an umbilical termination assembly (UTC) via electrical jumpers and hydraulic/chemical jumpers. The umbilical is connected between the UTC and a topside installation (not shown).

A subsea control module (SCM) is connected to a connection interface XTCI (FIG. 2a) of the Christmas tree 2. The SCM shown in FIGS. 2a and 2b has been manufactured and sold by FMC Technologies for many years. The SCM contains electronics, instrumentation, and hydraulics for safe and efficient operation of subsea tree valves, chokes, and also downhole valves in the well, all control operations for keeping the well under control.

The SCM is supplied with a high pressure fluid from a high pressure input fluid line and a low pressure fluid from a low pressure input fluid line. These high pressure and low pressure fluids may arrive to the SCM from the umbilical via the UTC and hydraulic jumper (FIG. 1). The SCM comprises a high pressure manifold with respective control valves and a low pressure manifold with respective control valves for distributing and controlling the fluid supplied to the respective tree valves, chokes and downhole valves. Typically, the high pressure fluid is used to control downhole valves, and the low pressure fluid is used to control valves and chokes of the subsea module.

The design of actuators and valves for subsea wells are dictated by stringent demands on the standard and function for these valves because of the dangers of uncontrolled release of hydrocarbons. A typical demand is that these valves must be failsafe closed, meaning that they must close upon loss of power or control. The only practical means today in subsea environments, is to use springs that are held in the compressed state by the hydraulic pressure, keeping the valve open, and which is released in the event of loss of hydraulic pressure, thus closing the valve. The spring force needed to close a valve is dependent on both the well pressure and the ambient pressure, with larger ambient pressure demanding larger springs.

For the control of subsea wells, a connection between the well and a monitoring and control station must be established. This station can either be located in a floating vessel, platform or fixed platforms near the subsea installations or in a land station a long distance away. It is also possible to have a locally positioned part of a control system subsea. Communication between the control station and the subsea installation is normally provided by installing an umbilical between the two points. The umbilical contains lines for the supply of hydraulic fluid to the various actuators in or by the well, electric lines for the supply of electric power and signals to various monitoring and control devices and lines for signals to pass to and from the well. This umbilical is a very complicated and expensive item, costing several thousand dollars per meter.

It would therefore be very cost-saving to be able to eliminate the umbilical. In the invention, the standard hydraulic lines can be eliminated while maintaining the standard hydraulic spring-operated failsafe system.

The oil and gas industry is facing several challenges with respect to reducing costs for subsea equipment and subsea operations. Hence, one object is to reduce the size and cost of control devices for subsea modules. Another object of the invention is to standardize the design of such control devices while at the same time allowing the owner and/or operator of the oil/gas field to adapt the control devices according to their specifications.

Another objective is to provide a fail-safe actuator where the operator can assure that the actuator is able to provide its function in case of loss of input force to the actuator.

SUMMARY OF THE INVENTION

The invention is set forth in the independent claims, while the dependent claims define other characteristics of the invention.

The actuator may comprise a motor connected to a motor axle, preferably via one or more gearboxes for transferring motor force to a stem rotationally connected to a rotating component such as a rotating valve (ball valve).

The stem and the rotating valve are connected such that they are fixedly connected when rotating and movable relative each other in the axial direction. This may be achieved e.g. by a spline connection between the stem and the valve. A spline connection between two components arranged in a radial, e.g. one component fully enclosing the other component such as concentric, relationship, may comprise one or more protrusions or recesses extending in an axial direction of the first component and corresponding recesses or protrusions, respectively, on the second component. Thereby, the first and second components may be locked together in the rotational direction and be movable relative each other in the axial direction. The connection and/or interface between the stem and the rotating valve may comprise an adjusting device for correcting any misalignment between the end positions of the actuator assembly and a dumping/ventilation position and a production position for the valve. This may be advantageous in situations where the angle of the valve between dumping/ventilation position and production position only allows for a few degrees of misalignment. The skilled person will understand how such a connection and/or interface can be made and it will not be discussed any further herein.

The actuator is suitable to form part of a subsea control system. In order to make sure that the valves can be closed, each subsea system comprises one actuator according to the invention. In a given setup, the actuator is a fail-safe open actuator which, upon loss of input force, empties a hydraulic fluid volume for a gate valve operating a gate element in a X-mas tree. This gate valve is thus a fail-safe close valve which operates the gate element to close a bore when the hydraulic volume is dumped/ventilated.

The invention relates to a subsea actuator for actuating a subsea rotating component, comprising:
- a first biasing element;
- a motor;
- a holding element configured to receive an input force;
- a rotatable stem operatively connectable to the component,
- a force transmitting arrangement connectable to the first biasing element and the holding element;
- a first connection which in a first mode is configured to lock the stem in a rotatable engagement with the motor and in a second mode is configured to unlock the stem from the rotatable engagement with the motor and allow the stem to be influenced by the first biasing element;
    - wherein the first biasing element and the stem are releasably connected via the force transmitting arrangement, such that when the first biasing element and the stem are released from each other, the first biasing element is configured to be pre-tensioned to a position representing a first pre-tensioned position of the actuator without operating the stem;
    - the holding element is configured to exert a holding force on the force transmitting arrangement and the first biasing element in the first pre-tensioned position; and wherein, when the first biasing element and the stem are connected and the first biasing element is pre-tensioned, the first connection is in the first mode such that the motor is configured to operate the stem to a position representing a second pre-tensioned position of the actuator;
    - wherein, in the second pre-tensioned position, upon loss of input force to the holding element, the holding element is configured to release its holding force on the force transmitting arrangement and the first biasing element, thereby the first connection is unlocked to its second mode, such that the pre-tensioned first biasing element is released and rotates the stem to a position representing a release position of the actuator.

The first biasing element may be a spring, such as a spiral spring able to be pre-tensioned upon rotation and/or compression, or cup spring. Alternatively, the first biasing element may be made of a polymer/elastomer or rubber material adapted to be pre-tensioned.

In the second pre-tensioned position of the actuator, i.e. when the first biasing element is in the pre-tensioned position and the motor has operated the stem, the first biasing element, via the force transmitting arrangement, is configured to rotate the stem and thereby the component.

If the actuator loose its input force in the second pre-tensioned position, e.g. an input force in the form of electric power or hydraulic fluid pressure from an external source such as a floating installation, another subsea system or from a land-based installation, the actuator is configured to operate the rotating component e.g. to a dumping/venting position.

In an aspect, the first biasing element is a spring.

It is further described a subsea actuator for actuating a subsea rotating component between a base position and an activated position and always ensuring possibility to rotate the rotating component back to the base position, the actuator having three modes, including a base mode, a tensioning mode and an activated mode, the actuator comprising:

- a first biasing element fastened between a base for a rotatable stem and a force transmitting arrangement; the rotatable stem is operatively connectable to the component and having the same rotation as the component;
- a motor providing rotational movement releasably connectable to the stem;
- a holding element arrangement configured to receive an input force and providing a releasable connection between the motor and the stem through interaction with the force transmitting arrangement;

such that in the base mode the holding element is without an input force and thereby the motor is rotationally decoupled from the rotatable stem as the force transmitting piece is released from the holding element, the biasing element rotationally released and thereby acting on the arrangement rotating the stem to the base position;

in tensioning mode the stem is kept in a base position, the holding element receives an input force activating the holding element and also tensioning the first biasing element until the force transmitting piece is interacting with the holding element, thereby connecting the motor to the rotatable stem, keeping the stem in base position; and in activated mode, the first biasing element is tensioned, the holding element is interacting with the force transmitting arrangement, connecting the motor to the stem, thereby making it possible to move the component to an activated mode by the use of the motor.

According to an aspect, the actuator further comprises a second biasing element configured to assist in the connection of the first biasing element and the stem by pushing the force transmitting arrangement towards the holding element.

In an aspect, the holding element is an electromagnet, the input force is electrical power and the force transmitting arrangement comprises a magnet armature plate, and wherein the electromagnet is configured to create a magnetic field and the magnet armature plate is of a material susceptible to influence from the magnetic field strong enough to hold the magnet armature plate in the second pre-tensioned position of the actuator, and wherein, upon loss of electric power to the electromagnet, the actuator is configured to automatically rotate the stem to the release position of the actuator by releasing pre-tensioned force of the first biasing element.

In an aspect, the first biasing element is a spring which is connected to a rotatable plate in a first spring fastening point and to the magnet armature plate in a second spring fastening point, and wherein the spring and the stem, when connected, is configured to rotate together. Alternatively, the second spring fastening point can be an upper shaft/upper spring fastening plate rotatably locked to the magnet armature plate.

In an aspect, the actuator further comprises an outer cylindrical element and a clutch ring rotatably locked to the rotatable plate, and wherein the cylindrical element or the clutch ring comprises a guiding surface for guiding a roller bearing arranged in a rotational lock relative the magnet armature plate. Alternatively, the rotatable plate and cylindrical element may be formed in one piece. In one embodiment, the rotatable plate and cylindrical element together forms a pitch fork shape. In another embodiment the rotatable plate and the cylindrical element can comprise a semi-cylindrical axial extending wall extending from the periphery of the rotatable plate and in an axial direction of the cylindrical element. In a preferred embodiment, the wall covers at least 180 degrees of the cylindrical element.

In an aspect, the second biasing element is configured to push a magnet armature plate into engagement with an electromagnet.

In an aspect, the holding element is a piston driven by a supply pressure, the force transmitting arrangement is a movement converter device in connection with a hollow cylinder and the stem is an additional shaft rotatably locked to the component, wherein the movement converter device in connection with the hollow cylinder is adapted to transfer a linear movement of the first biasing element into a rotational movement of the stem, and wherein the supply pressure is configured to hold the movement converter device in the second pre-tensioned position of the actuator and wherein, upon loss of supply pressure, the actuator is configured to automatically actuate the stem representing a release position of the actuator.

In an aspect, the actuator enters the first pre-tensioned position when the supply pressure to the piston is restored.

In an aspect, the second biasing element may push the force transmitting arrangement towards the holding element via a clutch lever.

The first biasing element may be a spring which is connected to a rotatable plate in a first spring fastening point and to an upper spring fastening plate in a second spring fastening point, and the spring and the stem, when connected, may be configured to rotate together.

The actuator may further comprise an outer cylindrical element and a clutch ring rotatably locked to the rotatable plate, and the cylindrical element or the clutch ring may comprise a guiding surface for guiding a roller bearing arranged in a rotational lock relative a splined clutch sleeve. The splined clutch sleeve may be configured to provide a force on a clutch lever for engaging a magnet armature plate into connection with the electromagnet. The magnet armature plate may be arranged in an opposite end of the clutch lever relative the splined clutch sleeve.

The second biasing element may be configured to push the clutch lever towards the splined clutch sleeve and thus assist in engagement between the magnet armature plate and the electromagnet.

The invention further relates to a method of actuating a subsea actuator for actuating a subsea rotating component, wherein the subsea actuator comprises a first biasing element, a motor, a holding element configured to receive an input force, a rotatable stem operatively connectable to the component, a force transmitting arrangement connectable to the first biasing element and the holding element and a first connection, which first connection in a first mode is configured to lock the stem in a rotatable engagement with the motor and in a second mode is configured to unlock the stem from the rotatable engagement with the motor and allow the stem to be influenced by the first biasing element, wherein the method comprises the steps of:
  providing a releasable connection between the first biasing element and the stem via the force transmitting arrangement such that when the first biasing element and the stem are operated to be released from each other, the first biasing element is configured to be pre-tensioned to a position representing a first pre-tensioned position of the actuator without operating the stem;
  providing the holding element with a configuration such that the holding element is configured to exert a holding force on the force transmitting arrangement and the first biasing element in the first pre-tensioned position; and wherein, when connecting the first biasing element and the stem and pre-tensioning the first biasing element to a first mode of the first connection, operating the motor to operate the stem to a position representing a second pre-tensioned position of the actuator; and
  providing the holding element with a configuration such that the holding element, upon loss of input force, releases its holding force on the force transmitting arrangement and the first biasing element to unlock the first connection to its second mode, such that the pre-tensioned first biasing element is released and rotates the stem to a position representing a release position of the actuator.

This will give an actuator which, as long as there is an force input, either electric and or hydraulic, will hold the valve or other element connected to the actuator, in a normal operation mode, where the motor is coupled to the stem of the valve and there in addition is a tensioning element, i.e a spring, in tensioned mode, ready to actuate the actuator to fallback mode if loss of input force. This also gives that the actuator may in normal operation mode, be operated by running to motor to actuate the valve or other element, between a normal operation position and fallback position.

If loss of input force, the connection between the valve stem and the motor will be released and the spring (first biasing element) will force the valve or other element to fall back mode due to the pre-tension of the spring. When this has happened, the spring has lost it pre-tensioning. To get the actuator/valve back in normal operation mode when there again is force input in the system, the actuator with its elements are configured such that the motor "takes hold of" one end of the spring and rotates this to pre-tension the spring, without moving the valve or stem of the actuator as there at this point is no connection between the valve stem and the motor. When the spring is pre-tensioned the system locks the motor and valve stem together, by the holding element, and the connection between the motor and the valve stem is achieved. The motor can now be operated to move the valve between its positions, normal operation position and fallback position. But there is no connection between the valve stem and the motor before the spring is pre-tensioned and is able to force the valve back to the fallback position if loss of force input.

In an aspect, the method further comprises operating a motor to pre-tension the first biasing element to the first pre-tensioned position of the actuator.

In an aspect, the method further comprises allowing a hydraulic fluid to pre-tension the first biasing element to the first pre-tensioned position of the actuator.

In all four embodiments described in greater detail below, the connection and/or interface between the stem and the rotating valve or any other equipment operated by the actuator rotation, may comprise an adjusting device for correcting any misalignment between the two positions of the stem of the actuator and the two positions of the valve or the other equipment, i.e. a dumping/ventilation position and a production position for the valve, i. This may be advantageous in situations where the angle of the valve between dumping/ventilation position and production position only allows for a few degrees of misalignment. The skilled person will understand how such a connection and/or interface can be made and will not be discussed any further herein.

Furthermore, a number of bearings, including thrust bearings to support axial loads as well as rotational bearings to support rotational or torsion loads, may be arranged at dedicated positions between relative moving parts experiencing large forces.

In addition, the upper spring fastening plate supporting the second end (e.g. upper end) of the first biasing element is preferably of a larger relative diameter than the corresponding support provided by the rotatable plate supporting the first end (e.g. lower end) of the first biasing element.

The invention will now be described with reference to four preferred embodiments, wherein, in the first, second and fourth embodiments, the input force are electric power and in the third embodiment the input force is hydraulic fluid supply.

First Embodiment—Quick Dump Actuator (QDA)—Multiple Shafts

A first embodiment of a subsea quick dump actuator for actuating a subsea rotating valve will now be described. The actuator according to the first embodiment is powered by an electric input force and comprises more than one shaft.

The functioning of the actuator in the first embodiment is the presence of a first biasing element in the form of a spiral spring which can be pre-tensioned by rotating a first end of the spring relative a second end of the spring, thereby the spring is pre-tensioned to be able to rotate an element connected to the spring.

In the first embodiment the subsea rotating component is a rotating valve, the first biasing element may be a rotatable spiral spring, the holding element is an electromagnet, the rotatable stem is a combination of shaft and lower shaft extension, the force transmitting arrangement is magnet armature plate rotatably locked to the shaft and lower shaft extension.

The actuator comprises a motor arranged to operate the rotating valve to rotate. The motor is in operational relationship with the rotating valve and is, in at least one pre-tensioned position of the actuator, adapted to provide a force acting on the valve, preferably a rotational force. Similarly, a first biasing element together with a force transmitting arrangement is, at least in one pre-tensioned position of the actuator, arranged to operate the valve to rotate. Therefore, both the motor and the first biasing element are operable to rotate the valve, however, only one of the motor and the first biasing element is operable to rotate the valve at the time. If the actuator is in a position where the motor can operate the valve, the first biasing element is also in a position where it can operate the valve. Furthermore, the motor is allowed to operate the valve when the actuator is in a first pretensioned position (the first biasing element has been pretensioned) and in a second pre-tensioned position (i.e. to a production mode of the actuator), when an input force is present. Thus, the system provides for a fail-safe function preventing the motor to accidentally operate the valve.

The actuator comprises a housing. The housing is preferably formed with recesses for guiding and stabilization of various components housed inside the housing. The motor may be arranged inside the housing or be arranged in a dedicated motor housing outside the housing. The motor is typically electrically operated.

The actuator further comprises a rotatable plate arranged within the housing. The rotatable plate is rotatably locked to the motor via a set of transition gears and follows rotational movement (in both directions) of the motor through e.g. a key way connection to the transition gear. An axial extension of the rotatable plate is fully enclosed by one of the transition gears, however this is not necessary for the function of the actuator provided that the transition gear and the rotatable plate is in a rotational locked relationship. A lower shaft extension extends through the rotatable plate and the transition gear and is freely movable in the rotational direction relative the rotatable plate and transition gear. The rotatable plate, the lower shaft extension and the transition gear have a common center axis. This common center axis is extending from one end of the housing (e.g. to an electromagnet arranged at an upper end of the housing) through a center axle which is connected to the lower shaft extension arranged at the opposite end of the housing, via the lower shaft extension and to a valve coupling connected to the valve. The center axle is stationary in the axial direction but is allowed to move in the rotational direction (however, it is preferably formed with a 'slick' surface such that it is not rotationally locked to any components in the rotational direction either). A shaft and a magnet armature plate enclose an upper portion of the center axle. The valve coupling, the lower shaft, the shaft and the magnet armature plate are locked to each other in the rotational direction, but are allowed to move relative each other in the axial direction in a telescopic manner, for example by means of a number of spline connections. Upper and lower bearings are provided between the magnet armature plate and the shaft and between the shaft and the lower shaft extension, respectively, to allow and support relative axial movement of these parts.

The rotatable plate is connected to a clutch ring via an outer cylindrical element. Thus, any rotational movement of the rotatable plate will rotate the outer cylindrical element and the clutch ring. The operational relationship between the rotatable plate, the outer cylindrical element and the clutch ring can be considered as one common piece which is operationally connected both in axial and rotational directions (e.g. the rotatable plate and cylindrical element form a pitch fork shape). Furthermore, the clutch ring/outer cylindrical element comprises a guiding surface for guiding a roller bearing arranged on a magnet armature plate. The clutch ring surrounds the electromagnet and an upper portion of the magnet armature plate in the first and second pre-tensioned positions of the actuator.

The lower shaft extension is at least partially surrounding the center axle.

The rotatable plate is further fixedly connected to a first end of a first biasing element (e.g. lower end) such that any rotational movement of the rotatable plate is transferred to the first biasing element. The rotatable plate is configured such that it is prevented from rotation by any other components except the motor. The connection to the transition gears provides for this.

A second end of the first biasing element (e.g. upper end) is either fixedly connected to the magnet armature plate directly or connected to an upper shaft/upper spring fastening plate rotatably locked but axially flexible relative the magnet armature plate, in a manner such that any rotational movement of the first biasing element is transferred to the magnet armature plate, and vice versa.

The first biasing element is arranged inside the housing and encloses the lower shaft extension and the shaft, as well as parts of the center axle.

The second end of the first biasing element (e.g. upper end), and thus the magnet armature plate, is rotationally locked to the valve. Consequently, if the magnet armature plate and the second end of the first biasing element rotates, the valve rotates.

The first biasing element is pre-tensioned by rotation, i.e. through relative rotational movement of the magnet armature plate (which is fixedly connected to the second end of the first biasing element) and the rotatable plate (which is fixedly connected to the first end of the first biasing element). In any position of the first biasing element in the actuator, the first biasing element is in a pre-tensioned state.

The housing is further provided with a fixed end stop for the second end of the biasing element and the magnet armature plate.

The magnet armature plate comprises at least one roller bearing extending in the radial direction for interaction with the guiding surface on the clutch ring/outer cylindrical element. Thus, the roller bearing(s) on the magnet armature plate moves along the guiding surface(s) when the magnet armature plate moves relative the clutch ring/outer cylindrical element. The guiding surface is preferably formed as a groove which comprises a first portion forming an angle of 0 degrees with a horizontal plane transverse to the centre axle and a second portion forming an angle between 30 and 80 degrees with the horizontal plane. The second portion extends in a direction towards the clutch ring. The total length of the first and second portions are preferably ¼ of a full circle, i.e. 90 degrees.

An end stop for the rotational movement of the magnet armature plate, and thus the roller bearing, is formed in the actuator housing.

In all positions of the elements forming part of the actuator, the valve is not moved in the axial direction and is only operated to rotate.

The actuator further comprises a holding element in the form of an electromagnet arranged in one end of the housing (e.g. at the upper end, at the same end as the clutch ring and magnet armature plate). The input force to the electromagnet is by means of electricity from a subsea installation or a remote location such as a floating or fixed installation, or from land. When the electromagnet is electrically powered, the electromagnet creates a magnetic field attracting the magnet armature plate towards the electromagnet. The size, strength and direction of the magnetic field is dependent on the sizes of electromagnet and the magnet armature plate, the voltage and current of the input force, and is adapted to the requirements in each specific project.

The electromagnet, in a production mode of the actuator represented by the second pre-tensioned position of the actuator, is adapted to receive an input force in the form electrical power. The force transmitting arrangement, i.e. the combination of the electromagnet and the magnet armature plate, functions such that the electromagnet attracts the magnet armature plate in a direction towards the electromagnet in any position of the actuator. However, due to the presence of the guiding surface in the housing, the magnet armature plate is only allowed to connect with the electromagnet when the roller bearing on the magnet armature plate is in the second portion of the guiding surface of the housing. A second biasing element may be provided to assist in the engagement of the magnet armature plate with the electromagnet. Alternatively, the presence of the second biasing element may be superfluous if the strength of the electromagnet is of a sufficient size to attract the magnet armature plate without further assistance.

Once electric power is on, the force of the electromagnet through clutch is larger than any forces from the first biasing element acting on the magnet armature plate thereby the valve is held in production mode. However, once electric power to the electromagnet is lost, the electromagnet does not provide enough holding force, thereby the force from the pre-tensioned first biasing element is the largest, and forces the magnet armature plate out of engagement with the electromagnet and the first biasing element rotates the magnet armature plate along the guiding surface provided in the housing rotating the valve e.g. 90 degrees until the upper end of the first biasing element abuts the end stop of the housing. During this release mode of the actuator, the rotatable plate is not rotating because it is prevented from rotation by an end stop in a base plate. The first biasing element has now released at least some of its stored pre-tensioned force represented by e.g. a 90 degree rotation of the second end of the first biasing element relative the first end of the biasing element.

The valve is now in a position representing a dumping/venting position of the valve and the actuator is in a release position.

When electric power is restored, the motor operates the transition gears to rotate the rotatable plate, the outer cylindrical element and the clutch ring in the same direction and the same rotational distance as the second end of the first biasing element and the magnet armature plate rotated during the release procedure described above. The first biasing element has now been pre-tensioned because the first end of the first biasing element has been rotated relative the second end of the first biasing element and the magnet armature plate (the second end of the biasing element is prevented from rotation due to its abutment against the end stop). Simultaneous, during rotation of the clutch ring and the outer cylindrical element, the roller bearing on the magnet armature plate has been guided on the guiding surface, and when entering the end part of the rotation, the roller bearing enters the second portion of the guiding surface, thereby the magnet armature plate engages with the electromagnet. The actuator is now in a position representing a first pre-tensioned position. The components of the actuator are, however, offset (equal to the rotation of the first biasing element, e.g. 90 degrees, relative the position in the production mode—also named second pre-tensioned position).

The valve has not been operated as a result of entering this first pre-tensioning position of the actuator because the valve only rotates when the magnet armature plate is in engagement with the electromagnet. In order to restore the components of the actuator to return to the position representing a production mode or second pre-tensioned position, the motor may now operate the valve (because the magnet armature plate is in engagement with the electromagnet such that the motor is allowed to operate the valve) to rotate in the opposite direction such that all of the components (magnet armature plate, cylindrical element, rotatable plate, first biasing element etc.) that have been rotated during the release and or first pre-tensioned position of the actuator to the position they had before release. The actuator is now in production mode, and the first biasing element is pre-tensioned to operate the valve to dump/vent upon loss of electric power.

The different operational positions of the actuator can thus be summarized as follows:

Release position (first biasing element (such as spiral spring) not tensioned, valve in dumping position, magnet armature plate decoupled from electromagnet, power to electromagnet off, also referred to as a base mode)

First pre-tensioned position (first biasing element (spiral spring) pre-tensioned, valve in dumping position, clutch ring engages magnet armature plate when rotation of upper end of spring is nearly finished and magnet armature plate engages with electromagnet, power to electromagnet on, also referred to as a tensioning mode)

Second pre-tensioned position (spring tensioned, valve in production position, magnet armature plate engaged with electromagnet, power to electromagnet on, also named production mode or activated mode).

Second Embodiment—Quick Dump Actuator (QDA)—Single Shaft

A second embodiment of the of a subsea quick dump actuator for actuating a subsea rotating valve will now be described. The actuator according to the second embodiment is powered by an electric input force and comprises one shaft.

In the second embodiment the subsea rotating component is a rotating valve, the first biasing element may be a rotatable spiral spring, the holding element is an electromagnet, the rotatable stem is a single shaft, the force transmitting arrangement is a magnet armature plate rotatably locked but axially movable relative to the single shaft.

The functioning of the actuator in the second embodiment is, similar to the first embodiment, the presence of a first biasing element in the form of a spiral spring which can be pre-tensioned by rotating a first end of the spring relative a second end of the spring, thereby the spring is pre-tensioned to be able to rotate an element connected to the spring.

The actuator comprises a motor arranged to operate the rotating valve to rotate. The motor is in operational relationship with the rotating valve and is, in at least one pre-tensioned position of the actuator, adapted to provide a force acting on the valve, preferably a rotational force. Similarly, a biasing element together with a force transmitting arrangement is, at least in one pre-tensioned position of the actuator, arranged to operate the valve to rotate. Therefore, both the motor and the biasing element are operable to rotate the valve, however, only one of the motor and the biasing element is operable to rotate the valve at the time. If the actuator is in a position where the motor can operate the valve, the biasing element is also in a position where it can operate the valve. Furthermore, the motor is allowed to operate the valve when the actuator is in a first pretensioned position (the first biasing element has been pretensioned) and in a second pre-tensioned position (i.e. a production mode of the actuator), when an input force is present. Thus, the system provides for a fail-safe function preventing the motor to accidentally operate the valve.

The actuator comprises a housing. The housing is preferably formed with recesses for guiding and stabilization of various components housed inside the housing. The motor may be arranged inside the housing or be arranged in a dedicated motor housing outside the housing. The motor is typically electrically operated.

The actuator further comprises a rotatable plate arranged within the housing. The rotatable plate is rotatably locked to the motor via a set of transition gears and follows rotational movement (in both directions) of the motor through e.g. a key way connection to the transition gear. An axial extension of the rotatable plate is fully enclosed by one of the transition gears, however this is not necessary for the function of the actuator provided that the transition gear and the rotatable plate is in a rotational locked relationship. A lower part of the single shaft extends through the rotatable plate and the transition gear and is freely movable in the rotational direction relative the rotatable plate and transition gear. The rotatable plate, the single shaft and the transition gear have a common center axis. This common center axis is formed by the single shaft extending from one end of the housing (e.g. to an electromagnet arranged at an upper end of the housing) to a valve coupling connected to the valve arranged in the opposite end of the single shaft. The single shaft is stationary in the axial direction. The single shaft is formed with a spline interface on at least parts of its outer surface in contact with the magnet armature plate. The magnet armature plate has corresponding spline interface on an inner surface thereof to form a spline connection with the single shaft. The spline connection locks the magnet armature plate to the single shaft in the rotational direction but allows for axial relative movement between the magnet armature plate and single shaft. The valve coupling, the single shaft and the magnet armature plate are thus locked to each other in the rotational direction, but are allowed to move relative each other in the axial direction. Upper and lower bearings are provided at appropriate positions along the shaft, respectively, to allow and support relative axial movement of these parts.

The rotatable plate is connected to a clutch ring via an outer cylindrical element. Thus, any rotational movement of the rotatable plate will rotate the outer cylindrical element and the clutch ring. The operational relationship between the rotatable plate, the outer cylindrical element and the clutch ring can be considered as one common piece which is operationally connected both in axial and rotational directions (e.g. the rotatable plate and cylindrical element form a pitch fork shape). Furthermore, the clutch ring/outer cylindrical element comprises a guiding surface for guiding a roller bearing arranged on a magnet armature plate. The clutch ring surrounds the electromagnet and an upper portion of the magnet armature plate in the first and second pre-tensioned positions of the actuator.

The rotatable plate is further fixedly connected to a first end of a first biasing element (e.g. lower end) such that any rotational movement of the rotatable plate is transferred to the first biasing element. The rotatable plate is configured such that it is prevented from rotation by any other components except the motor. The connection to the transition gears provides for this.

A second end of the first biasing element (e.g. upper end) is either fixedly connected to the magnet armature plate directly or connected to an upper shaft/upper spring fastening plate rotatably locked but axially movable relative the magnet armature plate, in a manner such that any rotational movement of an upper part of the first biasing element is transferred to the magnet armature plate, and vice versa.

The first biasing element is arranged inside the housing and encloses the single shaft.

The second end of the first biasing element (e.g. upper end), and thus the magnet armature plate, is rotationally locked to the valve. Consequently, if the magnet armature plate and the second end of the first biasing element rotates, the valve rotates.

The first biasing element is pre-tensioned by rotation, i.e. through relative rotational movement of the magnet armature plate (which is fixedly connected to the second end of the first biasing element) and the rotatable plate (which is fixedly connected to the first end of the first biasing element). In any position of the first biasing element in the actuator, the first biasing element is in a pre-tensioned state.

The housing is further provided with a fixed end stop for the second end of the biasing element and the magnet armature plate.

A base plate may comprise an end stop for the cylindrical element (and thus the rotatable plate.

The magnet armature plate comprises at least one roller bearing extending in the radial direction for interaction with the guiding surface on the clutch ring/outer cylindrical element. Thus, the roller bearing(s) on the magnet armature plate moves along the guiding surface(s) when the magnet armature plate moves relative the clutch ring/outer cylindrical element. The guiding surface is preferably formed as a groove which comprises a first portion forming an angle of 0 degrees with a horizontal plane transverse to the single shaft and a second portion forming an angle between 30 and 80 degrees with the horizontal plane. The second portion extends in a direction towards the clutch ring. The total length of the first and second portions are preferably ¼ of a full circle, i.e. 90 degrees.

An end stop for the rotational movement of the magnet armature plate, and thus the roller bearing, is formed in the actuator housing.

In all positions of the elements forming part of the actuator, the valve is not moved in the axial direction and is only operated to rotate.

The actuator further comprises a holding element in the form of an electromagnet arranged in one end of the housing (e.g. at the upper end, at the same end as the clutch ring and magnet armature plate). The input force to the electromagnet is by means of electricity from a subsea installation or a remote location such as a floating or fixed installation, or from land. When the electromagnet is electrically powered, the electromagnet creates a magnetic field attracting the magnet armature plate towards the electromagnet. The size, strength and direction of the magnetic field is dependent on the sizes of electromagnet and the magnet armature plate, the voltage and current of the input force, and is adapted to the requirements in each specific project.

The electromagnet, in a production mode of the actuator represented by the second pre-tensioned position of the actuator, is adapted to receive an input force in the form electrical power. The force transmitting arrangement, i.e. the combination of the electromagnet and the magnet armature plate, functions such that the electromagnet attracts the magnet armature plate in a direction towards the electromagnet in any position of the actuator. However, due to the presence of the guiding surface in the housing, the magnet armature plate is only allowed to connect with the electromagnet when the roller bearing on the magnet armature plate is in the second portion of the guiding surface of the housing. A second biasing element may be provided to assist in the engagement of the magnet armature plate with the electromagnet. Alternatively, the presence of the second biasing element may be superfluous if the strength of the electromagnet is of a sufficient size to attract the magnet armature plate without further assistance.

Once electric power is on, the force of the electromagnet through clutch is larger than any forces from the first biasing element acting on the magnet armature plate thereby the valve is held in production mode. However, once electric power to the electromagnet is lost, the electromagnet does not provide enough holding force, thereby the force from the pre-tensioned first biasing element is the largest, and forces the magnet armature plate out of engagement with the electromagnet and the first biasing element rotates the magnet armature plate along the guiding surface provided in the housing rotating the valve e.g. 90 degrees until the upper end of the first biasing element abuts the end stop of the housing. During this release mode of the actuator, the rotatable plate is not rotating because it is prevented from rotation by an end stop in a base plate. The first biasing element has now released at least some of its stored pre-tensioned force represented by e.g. a 90 degrees rotation of the second end of the first biasing element relative the first end of the biasing element. The valve is now in a position representing a dumping/venting position of the valve and the actuator is in the release position.

When electric power is restored, the motor operates the transition gears to rotate the rotatable plate, the outer cylindrical element and the clutch ring in the same direction and the same rotational distance as the second end of the first biasing element and the magnet armature plate rotated during the release procedure described above. The first biasing element has now been pre-tensioned because the first end (e.g. lower end) of the first biasing element has been rotated relative the second end (e.g. upper end) of the first biasing element and the magnet armature plate (the second end of the first biasing element is prevented from rotation during this operation of the motor due to its abutment against the end stop of the housing). Simultaneous, during rotation of the clutch ring and the outer cylindrical element, the roller bearing on the magnet armature plate has been guided on the guiding surface, and when entering the final part of the rotation movement, the roller bearing enters the second portion of the guiding surface, thereby the magnet armature plate engages with the electromagnet. The actuator is now in a position representing a first pre-tensioned position. The components of the actuator are, however, offset relative the position before the release position of the actuator (i.e. at an offset position equal to the rotation of the first biasing element, e.g. 90 degrees, relative the position in the production mode—also named second pre-tensioned position).

The valve has not been operated as a result of entering this first pre-tensioning position of the actuator because the valve only rotates when the magnet armature plate is in engagement with the electromagnet. In order to restore the components of the actuator to return to the position representing a production mode or second pre-tensioned position, the motor may now operate the valve (because the magnet armature plate is in engagement with the electromagnet such that the motor is allowed to operate the valve) to rotate in the opposite direction such that the all of the components (magnet armature plate, cylindrical element, rotatable plate, first biasing element etc.) that have been rotated during the release and or first pre-tensioned position of the actuator are rotated to the position they had before release. The actuator is now in production mode, and the first biasing element is pre-tensioned to operate the valve to dump/vent upon loss of electric power.

The different operational positions of the actuator can thus be summarized as follows:
- Release position (first biasing element (such as spiral spring) not tensioned, valve in dumping position, magnet armature plate decoupled from electromagnet, power to electromagnet off, also referred to as a base mode)
- First pre-tensioned position (first biasing element (spiral spring) pre-tensioned, valve in dumping position, clutch ring engages magnet armature plate when rotation of upper end of spring is nearly finished and magnet armature plate engages with electromagnet, power to electromagnet on, also referred to as a tensioning mode)
- Second pre-tensioned position (spring tensioned, valve in production position, magnet armature plate engaged with electromagnet, power to electromagnet on, also named production mode or activated mode).

Third Embodiment—Hydraulic Dump Actuator

A third embodiment of the of a subsea actuator for actuating a subsea rotating valve will now be described. The actuator according to the third embodiment is hydraulically powered by a hydraulic fluid pressurizing pistons in the actuator. The system comprises a first biasing element in the form of a compressed spiral spring which is compressed in a direction parallel to a center axis of the spring. A motor is arranged to operate the rotating valve to rotate. The motor is in operational relationship with the rotating valve and is, in at least one pre-tensioned position of the actuator, adapted to provide a force acting on the valve, preferably a rotational force. Similarly, a biasing element together with a force transmitting arrangement is, at least in one pre-tensioned position of the actuator, arranged to operate the valve to rotate.

In the third embodiment the subsea rotating component is a rotating valve, the first biasing element may be a compressible spiral spring, the holding element is the combination of fluid pressurizing piston(s) and a hollow cylinder, the rotatable stem is an additional shaft rotatably locked to the component, the force transmitting arrangement is a movement converter device operable to provide a rotating motion to roller bearings on the hollow cylinder.

The actuator comprises a housing preferably formed with recesses for guiding and possibly stabilization of various components housed inside the housing.

The motor may be arranged inside or outside the housing. The motor is connected to a motor axle, typically via one or more gears. The gears transfer rotational or linear forces or movements from the motor to a motor axle. A first end portion of the motor axle may be directly coupled to the motor or may be connected to the motor via one or more of the gears. The motor axle is preferably a rigid circular cylinder-shaped solid metal shaft having a fixed length. The motor axle is allowed to rotate when subjected to an input rotational force from the motor but is prevented from movement in the axial direction. A second end portion of the motor axle, which second end portion is not in contact with the motor or gears, is provided with a spline interface on the outer radial surface thereof. The spline interface may comprise one or more recesses or protrusions evenly divided at predetermined positions on the outer radial surface of the motor axle.

A hollow cylinder is arranged extending along the same center axis as the motor axle and is provided with a spline interface with protrusions or grooves, respectively, to mate with the spline interface on the motor axle, thereby forming a first spline connection. Furthermore, the hollow cylinder is thus locked in the rotational direction with the motor axle by the spline connection when the first spline connection is connected. However, the spline configuration of the first spline connection allows axial relative movement between the motor axle (motor axle is fixed) and the hollow cylinder such that the hollow cylinder is allowed to move axially relative the motor axle out of splined connection with the motor axle and thereby rotate freely relative the motor axle and motor. Thus, when the first spline connection between the motor axle and the hollow cylinder is connected, the motor and the stem (and thereby the valve) is rotatably coupled.

The hollow cylinder has one or more roller bearings on a radial outer surface thereof for interaction with the force transmitting arrangement, e.g. movement converter device, which interaction will be described in greater detailed below.

It is preferably an additional shaft with a common center axis as the center axis of the motor axle arranged at an extension of the motor axle inside the hollow cylinder. This additional shaft is rotatably locked with the valve element (e.g. ball valve) and is provided with a second spline connection towards an inner surface of the hollow cylinder, thereby being arranged in a rotational locking engagement with the hollow cylinder, in all axial relative positions between the additional shaft and the hollow cylinder. A spline connection between two components arranged in a radial, e.g. one component fully enclosing the other component such as concentric, relationship, may comprise one or more protrusions or recesses extending in an axial direction of the first component and corresponding recesses or protrusions, respectively, on the second component. Thereby, the first and second components may be locked together in the rotational direction and movable relative each other in the axial direction. The additional shaft is preferably supported by bearings allowing some vertical and radial travel to compensate for any minor un-equality or unevenness between the different components of the actuator.

The stem, i.e. the additional shaft, and the rotating valve is connected such that they are fixedly connected when rotating and stationary relative each other in the axial direction.

The actuator further comprises a holding element in the form of a piston arrangement. The piston(s) in the piston arrangement, in a production mode of the actuator represented by the second pre-tensioned position of the actuator, is adapted to receive an input force in the form of a fluid pressure, such as a pilot hydraulic pressure from a hydraulic system or, in another aspect a pilot pressure from a production flow or well flow. This fluid pressure pushes the piston(s) towards a force transmitting arrangement in the form of a movement converter device. The movement converter device has a first surface in contact with the biasing element and a second surface in contact with the piston(s), which second surface is opposite the first surface. The movement converter device is, when subjected to a pressure from the biasing element which is larger than the pressure exerted by the fluid on the second surface adapted to transfer a linear movement of the biasing element to a rotational movement of the hollow cylinder (i.e. the stem and thereby the valve). This transition from linear movement of the spring to rotational movement of the hollow cylinder, i.e. the stem, is possible due to the configuration of the movement converter device cooperating with at least one roller bearing fixed to a radial outer surface of the hollow cylinder thereby being in rotational and axial connection with the hollow cylinder. The hollow cylinder is either directly or indirectly connected to the additional shaft and rotationally locked but axially movable relative the additional shaft (and thereby the valve).

The configuration and relationship between the hollow cylinder and the movement converter device, in a preferred embodiment, has the shape of a shark fin or triangle, extending in an axial direction, i.e. a direction towards the roller bearings on the hollow cylinder. The shark fin shape is characterized in that it is adapted to interact with the roller bearing and provides a guide surface for the roller bearing forcing the roller bearing with the hollow cylinder to rotate (e.g. 90 degrees). The shark fin is, in one aspect, a protrusion which has a curved right-angled triangle form where the shape of the curve is preferably 90 degrees of a full circle. When comparing with a right-angled triangle, the right angle of the triangle is one of the two angles which the triangle forms with the second surface of the movement converter device, whereas the hypotenuse forms the guiding surface on which the roller bearing with hollow cylinder (and thereby the stem is guided, rotating the valve).

The presence of the force transmitting arrangement, i.e. the movement converter device and first biasing element, prevent the motor to operate the valve unintentionally when the actuator is in the released position. The motor is able to operate the valve, i.e. in mechanical connection with the valve, when the force of the fluid pressurizing the piston(s) on the second end of the movement converter device overcome the force from the first biasing element acting on the opposite first end of the movement converter device. Thus, the system has a built-in safety function preventing the motor to operate the valve unconsciously or by mistake unless the movement converter device and first biasing element are in a position represented by the first pretensioned position of the actuator. If the actuator is in a position where the motor can operate the valve, the first biasing element is also in a position where it can operate the valve. Furthermore, the motor is allowed to operate the valve when the actuator is in a first pretensioned position (the first biasing element has been fully pretensioned thereby locking the motor to the valve stem) and in a second pretensioned position (i.e. a production mode of the actuator), as well as in any positions between the first and second pretensioned positions, when an input force is present.

In order to assist in connecting the spline connection of the hollow cylinder to the spline connection of the motor axle, i.e. mating the first spline connection, there may be arranged a second biasing element which may be compressed and released in a direction parallel to the center axle of the motor axle, which second biasing element is compressed when the first biasing element is forcing the movement converter device and the hollow cylinder downwardly upon loss of pressure from the fluid acting on the pistons under actuation of the valve to a dumping position. When regaining pressure in the fluid, the second biasing element is arranged to assist in the mating of the first spline connection, i.e. the spline connection between the hollow cylinder and the motor axle. Alternatively, instead of using the second biasing element, it is possible to provide the force transmitting arrangement, i.e. the movement converter device, with a collar or similar on the inner surface to interact with a recess or groove on an outer surface of the hollow cylinder such that the movement converter device, upon regaining fluid pressures in the piston(s), is adapted to move the hollow cylinder, and thus the spline connection of the hollow cylinder, towards and into connection with the spline connection on the motor axle thereby forming the first spline connection. In both alternatives, the second spline connection between the additional shaft and the hollow cylinder is always connected in rotational direction but allowed to move in the axial direction.

In all positions of the elements forming part of the actuator, the valve is not moved in the axial direction and is only operated to rotate.

Then the different operation modes of the actuator will be described with reference to the elements described above, including:

Release position (fluid pressure to piston is lost, first biasing element not pre-tensioned, valve is in dumping position, also named base mode), First pre-tensioned position (fluid pressure to piston is restored, first biasing element is pre-tensioned, valve is in dumping position, also named tensioning mode)

Second pre-tensioned position (fluid pressure to piston is restored, first biasing element is pre-tensioned, valve in production position, also named production mode, also named activated mode)

When the fluid pressure to the pistons in the cylinders is lost, the force of the first biasing element on the first end of the movement converter device is larger than the force from the combined force of the piston(s) and the second biasing element acting on the opposite second end of the movement converter device (via the hollow cylinder and the roller bearings) thereby the compressed spring pushes the shark fin of the movement converter device against the roller bearings on the hollow cylinder axially (e.g. a few millimeters or centimeters, such as for example +/−5 mm, but can also be less or more) such that the hollow cylinder are released from the first spline connection with the motor axle. Now the valve is disconnected from the motor. The hollow cylinder, and thereby the rotatably locked valve, is, due to the release of the first spline connection, allowed to rotate together. The first biasing element pushes the movement converter device further down axially such that the roller bearings follows the shape of the shark fin and rotates the valve to a dumping position (for example 90 degrees rotation over an axial extension of 20 mm), representing by a released position of the actuator.

Once the fluid pressure is restored in the piston(s), the force of the piston(s) on the second end of the movement converter device is larger than the pressure from the first biasing element acting on the opposite first end of the movement converter device, thereby compressing the first biasing element. Simultaneously, the second biasing element pushes the hollow cylinder axially such that the first spline connection between the motor axle and the hollow cylinder is connected. During this operation, the valve has not been operated and is in the dumping position. Then the first biasing element is pre-tensioned and actuator is tensioned to perform its fail safe open function once the valve is re-set to a production mode. This particular position with tensioned first biasing element and valve in dumping position represents a first pre-tensioned position of the actuator.

The motor is now operated to rotate the hollow cylinder in the opposite direction than during release (i.e. in the direction opposite the shark fins), and thereby the valve, to the production mode of the actuator. This position is representing a second pre-tensioned position of the actuator. Now the actuator is returned to its production mode and the first biasing element is pre-tensioned to operate the valve to dump/vent upon loss of fluid pressure to the piston(s).

Fourth Embodiment—Quick Dump Actuator (QDA)—Single Shaft and Magnet Armature Plate and Magnet Displaced Relative Stem A fourth embodiment of the subsea quick dump actuator for actuating a subsea rotating valve will now be described. The actuator according to the fourth embodiment is powered by an electric input force and comprises one shaft.

The operational sequence described in relation to the first and second embodiments are valid for the fourth embodiment as well, as there are only minor differences between the first/second embodiments and the fourth embodiment.

In the fourth embodiment the subsea rotating component may be a rotating valve, the first biasing element may be a rotatable spiral spring, the holding element may be an electromagnet, the rotatable stem may be a combination of shaft and magnet armature plate with rotatably locked parts, the force transmitting arrangement may be a magnet armature plate connected to clutch lever which is pivotally connected to the actuator housing and manipulatable by splined clutch sleeve into connection/disconnection with an electromagnet.

The functioning of the actuator in the fourth embodiment may, similar to the first and second embodiments, be the presence of a first biasing element in the form of the spiral spring which can be pre-tensioned by rotating a first end of the spring relative a second end of the spring, thereby the first biasing element may be pre-tensioned to be able to rotate an element (such as a rotating valve) connected to the first biasing element.

The actuator may comprise a motor arranged to operate the rotating valve to rotate. The motor may be in operational relationship with the rotating valve and may, in at least one pre-tensioned mode of the actuator, be adapted to provide a rotational force action on the rotating valve. Similarly, the first biasing element together with the force transmitting arrangement may, at least in one pre-tensioned mode of the actuator, be arranged to operate the valve to rotate. Therefore, both the motor and the first biasing element may be operable to rotate the valve, however, only one of the motor and the first biasing element will be operated to rotate the valve at the time. If the actuator is in a position where the motor can operate the valve, the first biasing element is also in a position where it can operate the valve, but the first biasing element will only be used to operate the valve when there is a loss of input force and when there is a loss of input force the motor will not be able to operate the valve. Furthermore, the motor is allowed to operate the valve fall back position to normal operation position, when the actuator is in a first pretensioned position (the first biasing element has been pre-tensioned) and in a second pretensioned position (i.e. a production mode of the actuator), as well in any positions between the first and second pretensioned positions, when an input force is present. Thus, the system provides for a fail-safe function preventing the motor to accidentally operate the valve before the first biasing element is pre-tensioned.

The actuator may comprise a housing. The motor may be arranged in a dedicated motor housing outside the actuator housing.

The actuator may further comprise a rotatable plate arranged within the housing. The rotatable plate may be rotatably locked to the motor via a set of transition gears and may follow rotational movement (in both directions) of the motor through e.g. a key way connection to the transition gear. The transition gears may be arranged in a transition gear housing. An axial extension of the rotatable plate may be fully enclosed by one of the transition gears, however this is not necessary for the function of the actuator provided that the transition gear and the rotatable plate is in a rotational locked relationship. A lower part of the single shaft may extend through the rotatable plate and the transition gear and may be freely movable in the rotational direction relative the rotatable plate and the transition gear enclosing the rotatable plate. The rotatable plate, the single shaft and the transition gear enclosing the rotatable plate may have a common center axis. This common center axis may be formed by the single shaft extending from an upper end of the actuator housing to a valve coupling connected to the valve arranged in the opposite end of the single shaft. The single shaft may be stationary in the axial direction and may be formed with a spline interface on at least parts of its outer surface in contact with the splined clutch sleeve. The splined clutch sleeve may have corresponding spline interface on an inner surface thereof to form a spline connection with the single shaft. The spline connection may lock the splined clutch sleeve to the single shaft in the rotational direction but allow for axial relative movement between the splined clutch sleeve and the single shaft. The valve coupling, the single shaft and the splined clutch sleeve may thus be locked to each other in the rotational direction, but may be allowed to move relative each other in the axial direction. Upper and lower bearings may be provided at appropriate positions along the shaft, respectively, to allow and support relative axial movement of the parts.

The rotatable plate may be connected to a clutch ring via an outer cylindrical element. However, in a preferred aspect, the rotatable plate and cylindrical element can be formed in one piece. Preferably, the rotatable plate and the cylindrical element form a semi-cylindrical axial extending wall extending from the periphery of the rotatable plate and in an axial direction of the cylindrical element. In a preferred embodiment, the wall covers at least 180 degrees of the cylindrical element. Thus, any rotational movement of the rotatable plate will rotate the outer cylindrical element and the clutch ring. The operational relationship between the rotatable plate, the outer cylindrical element and the clutch ring can be considered as one common piece which is operationally connected both in axial and rotational directions. Furthermore, the clutch ring/outer cylindrical element may comprise a guiding surface for guiding a roller bearing arranged on splined clutch sleeve. The guiding surface comprises first and a second part, that are axially displaced relative each other.

The clutch lever may support the magnet armature plate through a pin and is pivotally connected through a pivot connection to the actuator housing. The clutch lever may comprise a through-going hole for receiving the stem.

The clutch lever may be provided with a protruding portion on a lower surface thereof for interaction with splined clutch sleeve, possibly via a thrust bearing. When the roller bearing on the splined clutch sleeve is in contact with a first part of the guiding surface on the clutch ring, the clutch lever is in an inclined position where the magnet armature plate is disconnected from the electromagnet. When the roller bearing is in contact with a second part of the guiding surface the clutch lever is no longer held in the inclined position (possibly via thrust bearing) and the clutch lever is allowed to rotate at the pivot connection such that the magnet armature plate in the distal end of the clutch lever moves downwardly by gravity (and possibly assisted by a second biasing element) into connection with the electromagnet. Once connected, and power is on, the electromagnet provides sufficient force for holding the magnet armature plate connected to the electromagnet. This is the case during normal production mode.

The rotatable plate may further be fixedly connected to a first end of the first biasing element (e.g. lower end of the first biasing element) such that any rotational movement of the rotatable plate is transferred to the first biasing element. The rotatable plate may be configured such that it is prevented from rotation by any other components except the motor. The connection to the transition gears provides for this.

A second end of the first biasing element (e.g. upper end of first biasing element) may be fixedly connected to the splined clutch sleeve directly or via an upper shaft/upper spring fastening plate rotatably locked but axially movable relative the splined clutch sleeve, in a manner such that any rotational movement of an upper part of the first biasing element is transferred to the splined clutch sleeve, and vice versa.

The first biasing element may be arranged inside the housing and encloses the single shaft.

The second end of the first biasing element (e.g. upper end), and thus the splined clutch sleeve, may be rotationally locked to the valve. Consequently, if the splined clutch sleeve and the second end of the first biasing element rotate, the valve rotates.

The first biasing element may be pre-tensioned by rotation, i.e. through relative rotational movement of the splined clutch sleeve and the rotatable plate (which may be fixedly connected to the first end of the first biasing element).

The actuator housing may further be provided with a fixed end stop for the second end of the first biasing element and the splined clutch sleeve, i.e. an end stop for a stop element on an upper shaft/upper spring fastening plate. The upper shaft/upper spring fastening plate may have a spline interface towards the single shaft such that it can move axially relative the single shaft and transfer rotational movements to the single shaft (and thereby the valve).

The splined clutch sleeve may comprise at least one roller bearing extending in the radial direction for interaction with the guiding surface on the clutch ring/outer cylindrical element. Thus, the roller bearing(s) on splined clutch sleeve may move along the guiding surface(s) when the splined clutch sleeve moves relative the clutch ring/outer cylindrical element. The guiding surface may preferably be formed as a groove which comprises a first portion forming an angle of 0 degrees with a horizontal plane transverse to the single shaft and a second portion forming an angle of 60 degrees with the horizontal plane and a third portion forming an angle of 0 degrees with the same horizontal plane but staggered in an axial direction relative the first portion. The second portion may extend in a direction towards the clutch ring. The total length of the first and second portions are preferably ¼ of a full circle, i.e. 90 degrees, so a movement of 90 degrees will move the roller bearing from the first portion to the third portion.

The end stop for the rotational movement of the stop element on the upper shaft/upper spring fastening plate, the splined clutch sleeve, and thus the roller bearing, may be formed in the actuator housing.

In all positions of the elements forming part of the actuator, the valve is not moved in the axial direction and is only operated to rotate.

The actuator may further comprise a holding element in the form of an electromagnet arranged parallel to the housing and below the magnet armature plate. The input force to the electromagnet may be by means of electricity from a subsea installation or a remote location such as a floating or fixed installation, or from land. When the electromagnet is electrically powered, the electromagnet may create a magnetic field attracting the magnet armature plate towards the electromagnet. The size, strength and direction of the magnetic field may be dependent on the sizes of electromagnet and the magnet armature plate, the voltage and current of the input force, and can be adapted to the requirements in each specific project.

The electromagnet, in a production mode of the actuator represented by the second pre-tensioned position of the actuator, may be adapted to receive an input force in the form electrical power. The force transmitting arrangement, i.e. the magnet armature plate connected to clutch lever which is pivotally connected to the actuator housing and manipulatable by splined clutch sleeve into connection/disconnection with electromagnet, may function such that the electromagnet attracts the magnet armature plate towards itself (i.e. in a direction downwardly towards the electromagnet) in any position of the actuator. However, due to the presence of the splined clutch sleeve with roller bearing for guiding in guiding surface, the magnet armature plate may only allowed to connect with the electromagnet when the roller bearing on the splined clutch sleeve has entered and passed the second portion of the guiding surface of the clutch ring. A second biasing element, arranged above, and in connection with the clutch lever, may be provided to assist in pushing the clutch lever downwardly and rotate such that the magnet armature plate moves downwardly and engages with the electromagnet. In addition to the second biasing element and the attractive magnet power, gravity may assist in forcing the clutch lever into engagement with the electromagnet. Alternatively, the presence of the second biasing element may be superfluous if the strength of the electromagnet assisted by gravity is of a sufficient size to attract the magnet armature plate without further assistance.

Once electric power is on, the force of the electromagnet is preferably larger than any forces from the first biasing element acting on the splined clutch sleeve (and thus the magnet armature plate) thereby the valve is held in production mode by holding the first biasing element in a pre-tensioned mode.

However, once electric power to the electromagnet is lost, the electromagnet does not provide enough holding force, thereby the force from the pre-tensioned first biasing element is the largest, and forces the magnet armature plate out of engagement with the electromagnet and the first biasing element rotates the splined clutch sleeve along the guiding surface rotating the valve e.g. 90 degrees until the upper end of the first biasing element abuts the end stop of the housing. During this release mode of the actuator, the rotatable plate is not rotating because it is prevented from rotation by an end stop in a base plate. The first biasing element has now released at least some of its stored pre-tensioned force represented by e.g. a 90 degrees rotation of the second end the first biasing element relative the first end of the first biasing element. The valve is now in a position representing a dumping/venting position of the valve, fallback position and the actuator is in the release position.

When electric power is restored the motor may operate the transition gears to rotate the rotatable plate, the outer cylindrical element (rotatable plate and cylindrical element can be seen as one piece) and the clutch ring in the same direction and the same rotational distance as the second end of the first biasing element and the splined clutch sleeve rotated during the release procedure described above. When rotated the similar degrees as the release procedure, the first biasing element has now been pre-tensioned because the first end of the first biasing element has been rotated relative the second end of the first biasing element and the splined clutch sleeve (the second end of the first biasing element is prevented from rotation during this operation of the motor due to its abutment against the end stop). Simultaneous, during rotation of the clutch ring and the outer cylindrical element, the roller bearing on the splined clutch sleeve has been guided on the guiding surface, and when entering the final part of the rotation movement, the roller bearing enters the second portion of the guiding surface, thereby the splined clutch sleeve moves downwardly, the clutch lever is forced to pivot on the protruding portion to a mainly horizontal position resulting in that the magnet armature plate connected in the distal end moves downwardly towards and into engagement with the electromagnet. The actuator is now in a position representing a first pre-tensioned position. The components of the actuator are, however, offset relative the position before the release position of the actuator (i.e. at an offset position equal to the rotation of the first biasing element, e.g. 90 degrees, relative the position in the production mode—also named second pre-tensioned position).

The valve has not been operated as a result of entering this first pre-tensioning position of the actuator because the valve only rotates when the magnet armature plate is in engagement with the electromagnet and the splined clutch sleeve is rotationally locked to the single shaft (via spline connection). In order to restore the components of the actuator to return to the position representing a production mode or second pre-tensioned position, the motor may now operate the valve (because the magnet armature plate is in engagement with the electromagnet such that the motor is allowed to operate the valve) to rotate in the opposite direction such that all of the components (splined clutch sleeve, cylindrical element, rotatable plate, first biasing element etc.) that have been rotated during the release and or first pre-tensioned position of the actuator are rotated to the position they had before release. The actuator is now in production mode, with the first biasing element pre-tensioned to operate the valve to dump upon loss of electric power.

As an alternative to the pivot connection, it is possible to provide this connection as a hydraulic connection, thereby providing a combined electro-hydraulic actuator. This may e.g. be done by arranging one or more hydraulically actuated cylinders with pistons extending in the axial direction of the actuator housing, wherein the cylinders may be configured to push, pull and/or otherwise force the clutch lever downwardly at the rotational point (i.e. at the position of the pivot connection) when hydraulic pressure is present. Such a system may have advantages in that it provides for a fail-safe function as a result of either hydraulic pressure loss or electric loss in the same actuator. When hydraulic pressure is present and electric power is on, the pistons may be arranged to push/pull the clutch lever 99 upwardly such that the opposite distal end with the magnet armature plate 84 is pivoted towards the electromagnet. This will represent a normal production mode. However, in the absence of either hydraulic pressure or electric power, the remaining force provided by the electromotor or the hydraulic pressure (and possibly second biasing element) is not sufficient for keeping the actuator in normal production mode, thereby the force from the pre-tensioned first biasing element is the largest, and forces the magnet armature plate out of engagement with the electromagnet and the first biasing element rotates the splined clutch sleeve along the guiding surface rotating the valve.

It is obvious for the person skilled in the art that the different features in the different aspects or embodiments may be combined in any way.

BRIEF DESCRIPTION OF THE FIGURES

The invention will now be described in non-limiting embodiment, with reference to the accompanying Figures wherein:

FIGS. 8B-8G shows an example of an operational sequence according to the third embodiment of the invention, and the components mutual positions in different sequences of the actuator;

FIGS. 9A-1 and 9A-2 are different cross section views along a vertical plane and shows a component overview of a fourth embodiment of the invention powered by an electric input—Quick Dump Actuator (QDA)—single shaft;

FIGS. 9B-1-9G show an example of an operational sequence according to the fourth embodiment of the invention, and the components mutual positions in different sequences of the actuator;

DETAILED DESCRIPTION OF THE FIGURES

Figure 3:
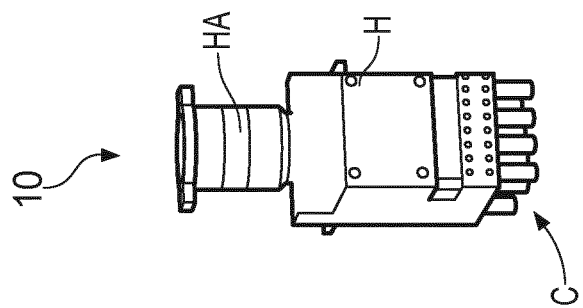
FIG. 3 illustrates a subsea hydraulic control device.
Figure 2B:
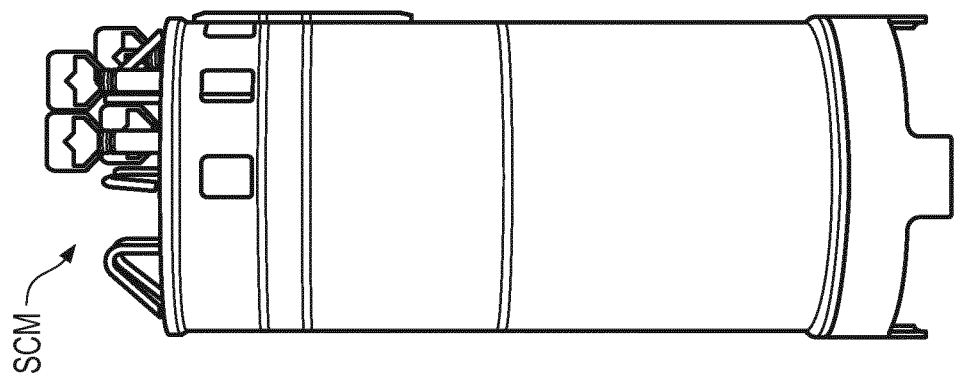
FIGS. 2a and 2b illustrates the prior art subsea control module.
Figure 2A:
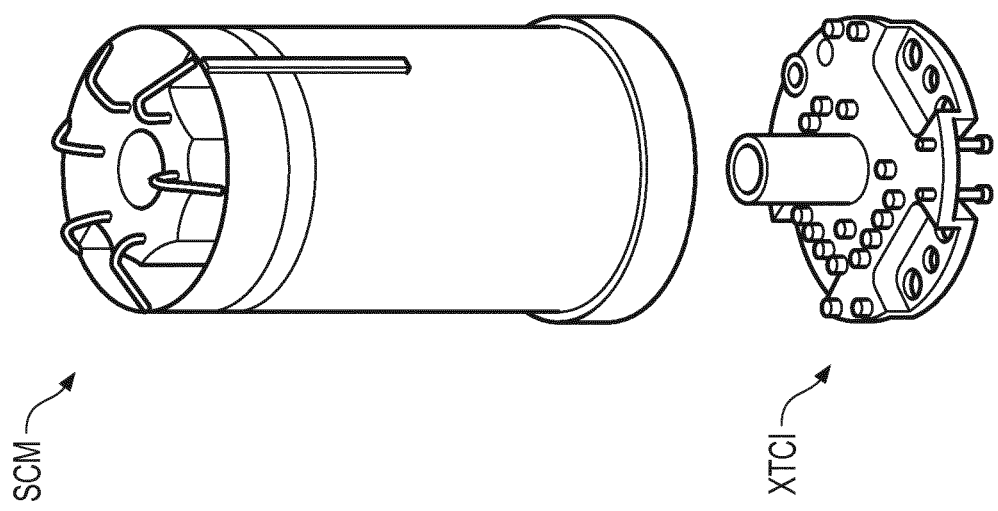

It is now referred to FIGS. 3, 4A and 4B and 5. FIG. 3 shows the outside appearance of a subsea hydraulic control device 10 comprising a housing H and hydraulic connectors C protruding from the lower side of the device 10. The housing H comprises a bladder or compensator equalizing the pressures on the inside and the outside of the capsule. The capsule protects against impacts etc. A chamber of 1 atm is formed inside the capsule for accommodating printed circuit board and other components which are sensitive for high pressure.

Figure 4A:
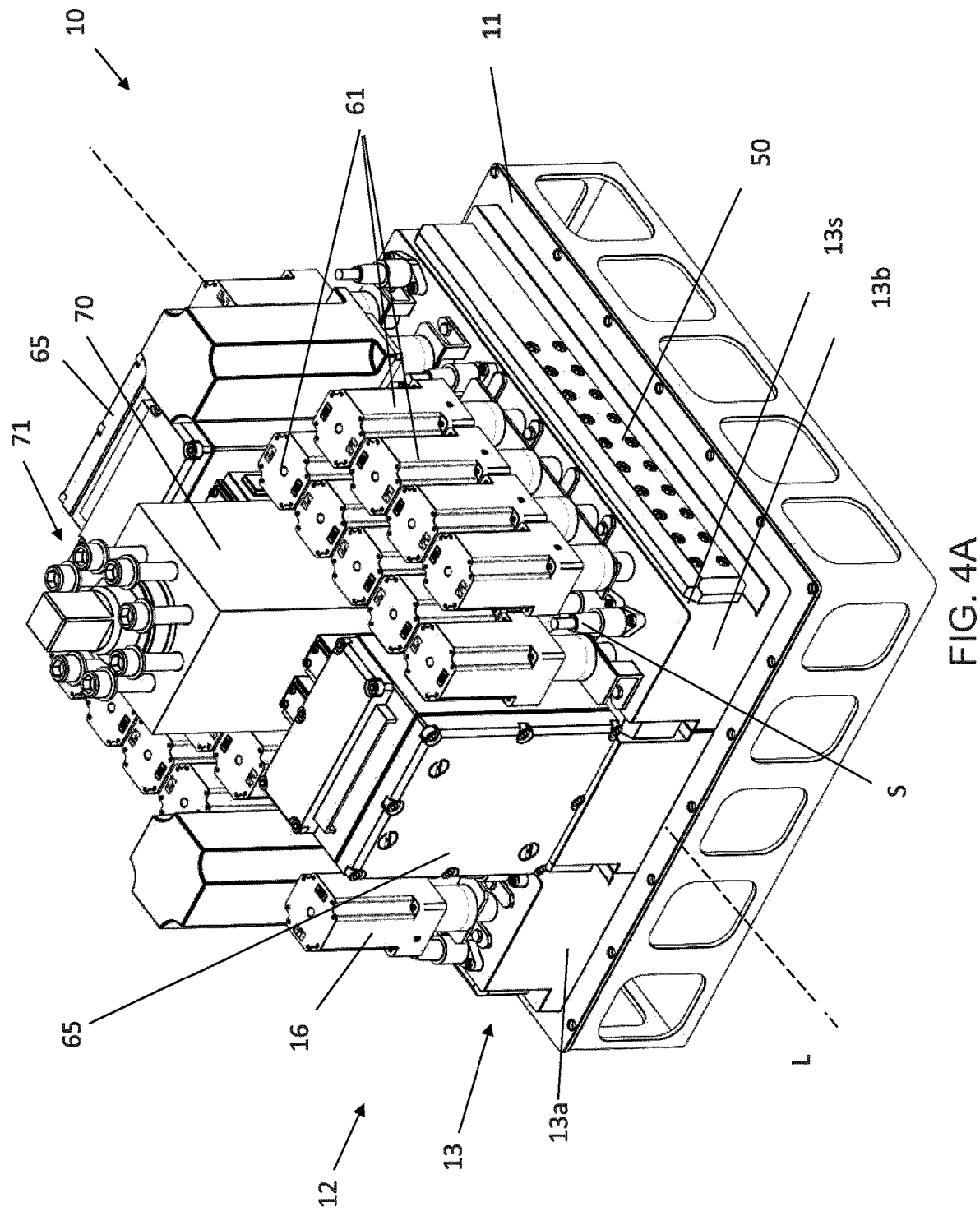
FIGS. 4A and 4B illustrate perspective views of two different subsea hydraulic control device, such as hydraulic control router, where the invention may be used, where the outer pressure barrier/canister has been removed.
Figure 4B:
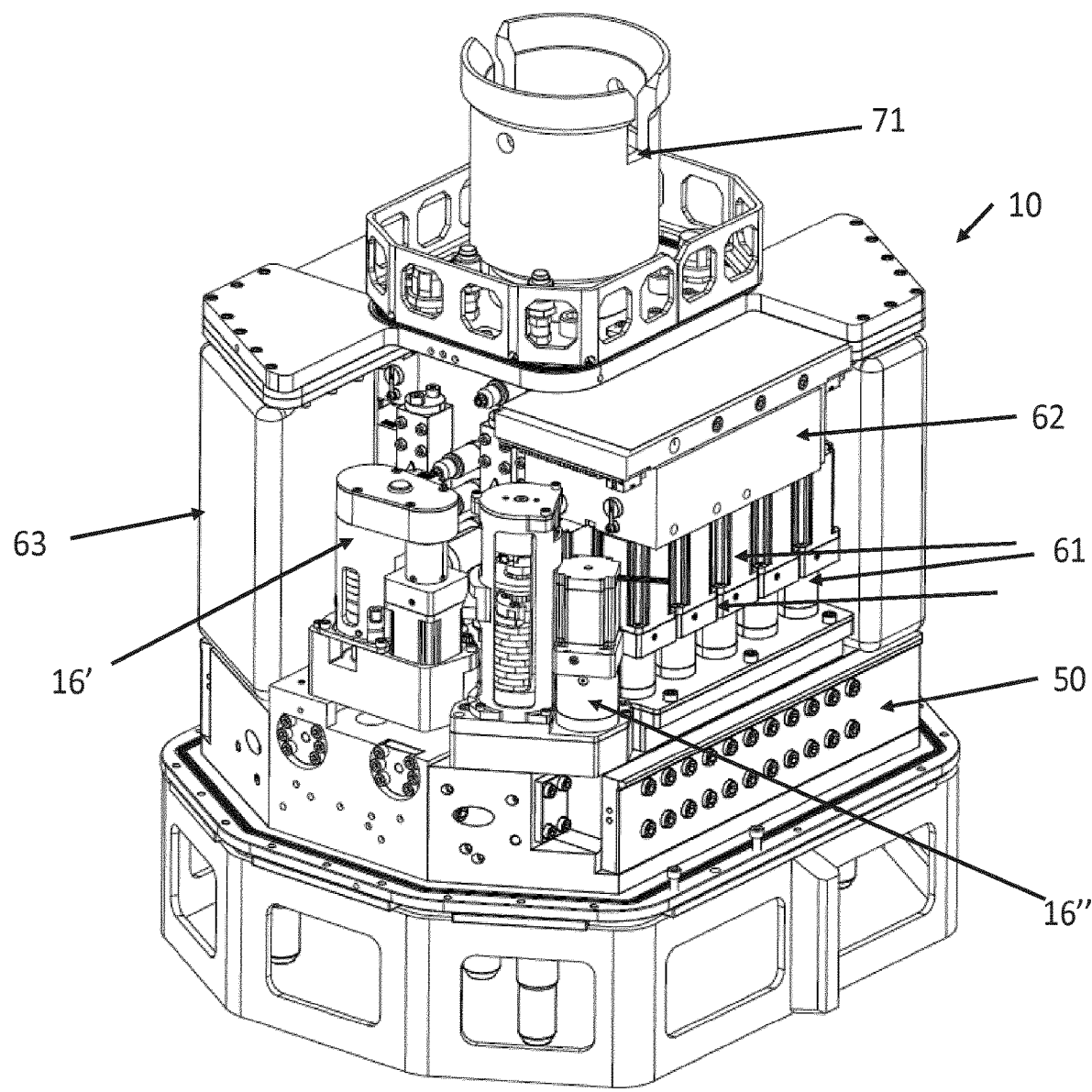
Figure 5:
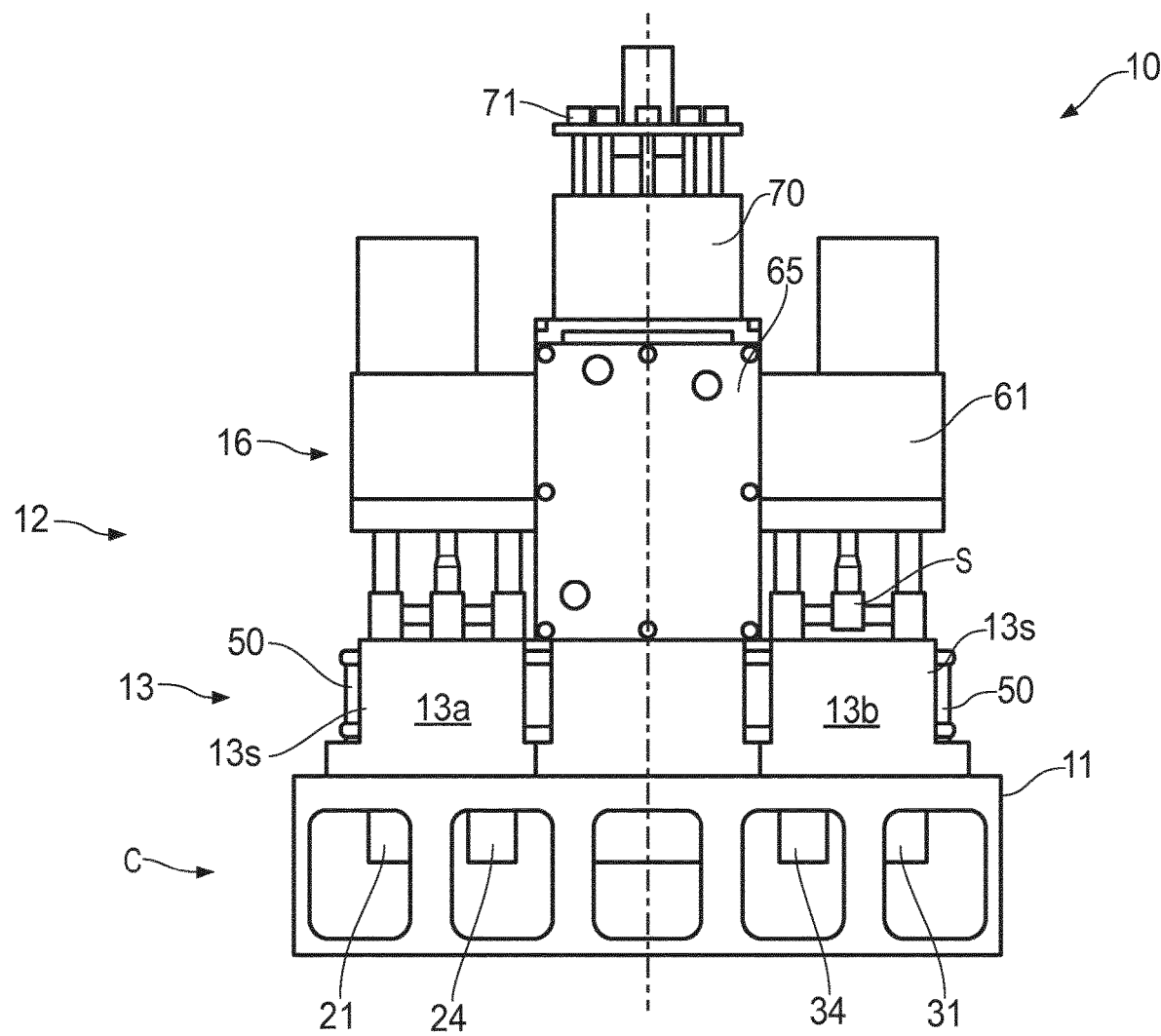
FIG. 5 is a side view of the subsea hydraulic control device of FIG. 4A.

It is now referred to FIGS. 4 and 5, where the housing H has been removed from the device 10.

The device 10 comprises a base structure 11 in the form of a base plate and a hydraulic distribution unit 12 mounted to the base plate 11. A ROV torque tool interface 71 is arranged on top of the device 10. The connectors C are protruding down from the hydraulic distribution unit 12. These connectors C can be one or a plurality of low pressure hydraulic input ports 21, low pressure hydraulic output ports 24, high pressure hydraulic input ports 31 and high pressure hydraulic output ports 34. These connectors C can also be one or a plurality of return fluid ports 41, or high pressure/low pressure return fluid ports 41a, 41b (even if these reference numbers are not shown in FIG. 4), which will be apparent from the description below. These connectors C are provided for connection to the subsea module 2, for example via a connection interface XTCI (Christmas Tree Connection Interface) or another type of connection interface. Alternately, some of the connectors C may be provided on top of, or on the side of, the device 10. Typically, the connectors C will be connected to the subsea module 2 via hydraulic fluid lines or jumpers in such a case. In addition, the connectors C may comprise electric power connectors for supplying electric energy to the device 10, for example to electric motors operating the valves. The connectors C may also comprise communication connectors for transferring communication signals and control signals between the device 10 and the module 2, and further to topside.

The hydraulic distribution unit 12 comprises a valve unit generally indicated with arrow 13 and a valve actuator unit generally indicated with arrow 16. There are one of each on both sides of the unit in the embodiment illustrated in the Figures, but this may vary dependent on the project. The valve unit 13 comprises several control valves, provided within the valve unit 13. A stem S of the control valve is shown in FIGS. 4A and 5 protruding upwardly from the valve unit 13, where the stem S is connectable to a valve actuator 61 of the valve actuator unit 16. Several valve actuators 61 are shown in FIG. 4, each of them are connected to a stem S of a control valve located within the valve unit 13. The valve actuator 61 may for example be an electric motor, such as an electric servo motor. The valve actuator may also be another type of actuating device. Above the actuators 61, it may be arranged a chamber 62 with 1 Atm inner pressure for accommodating printed circuit boards etc. (FIG. 4B). The device 10 may further comprise at least one bladder 63 for equalizing the pressure towards the pressure of the surrounding sea.

The valve actuator unit 16 further comprises a control system housing 65 in which a control system is provided for controlling the valve actuators 61. The control system comprises a control circuit for controlling the electric motors either by means of hardware circuits and/or by means of software running on a digital signal processor.

The manifold 50 comprises a high pressure manifold with respective control valves and a low pressure manifold with respective control valves for distributing and controlling the fluid supplied to the respective tree valves, chokes and downhole valves. Typically, the high pressure fluid is used to control downhole valves, and the low pressure fluid is used to control valves and chokes of the subsea module.

In FIG. 4B, a HDA 16' and a QDA 16" according to the invention is shown installed on the HCR 10.

Figure 6:
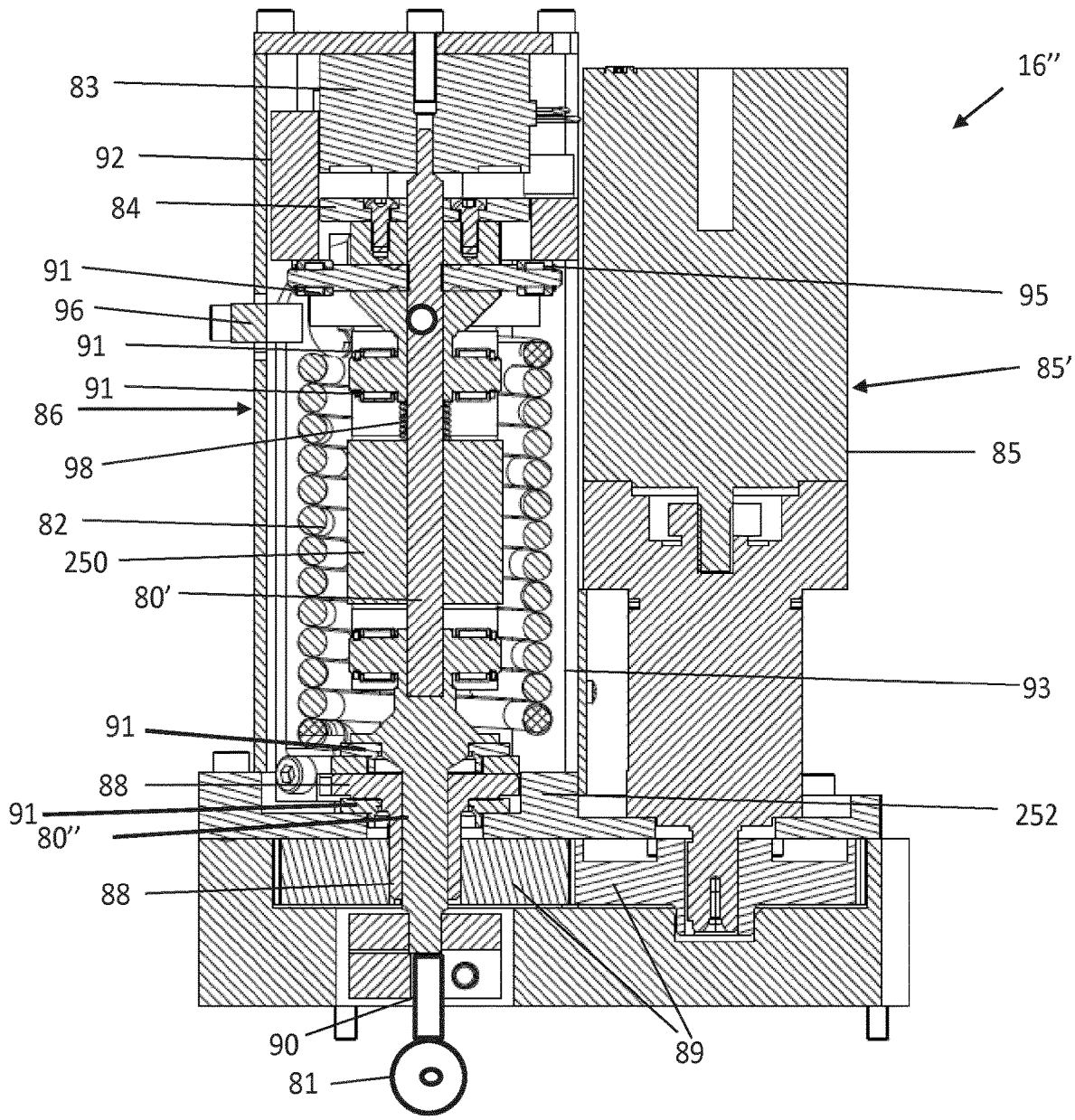
FIG. 6 is a cross section along a vertical plane and shows a component overview of a first embodiment of the invention powered by an electric input force—Quick Dump Actuator (QDA)—multiple shafts.

FIG. 6 is a cross section along a vertical plane and shows a component overview of a first embodiment of the invention powered by an electric input force—Quick Dump Actuator (QDA)—multiple shafts.

Figure 7A:
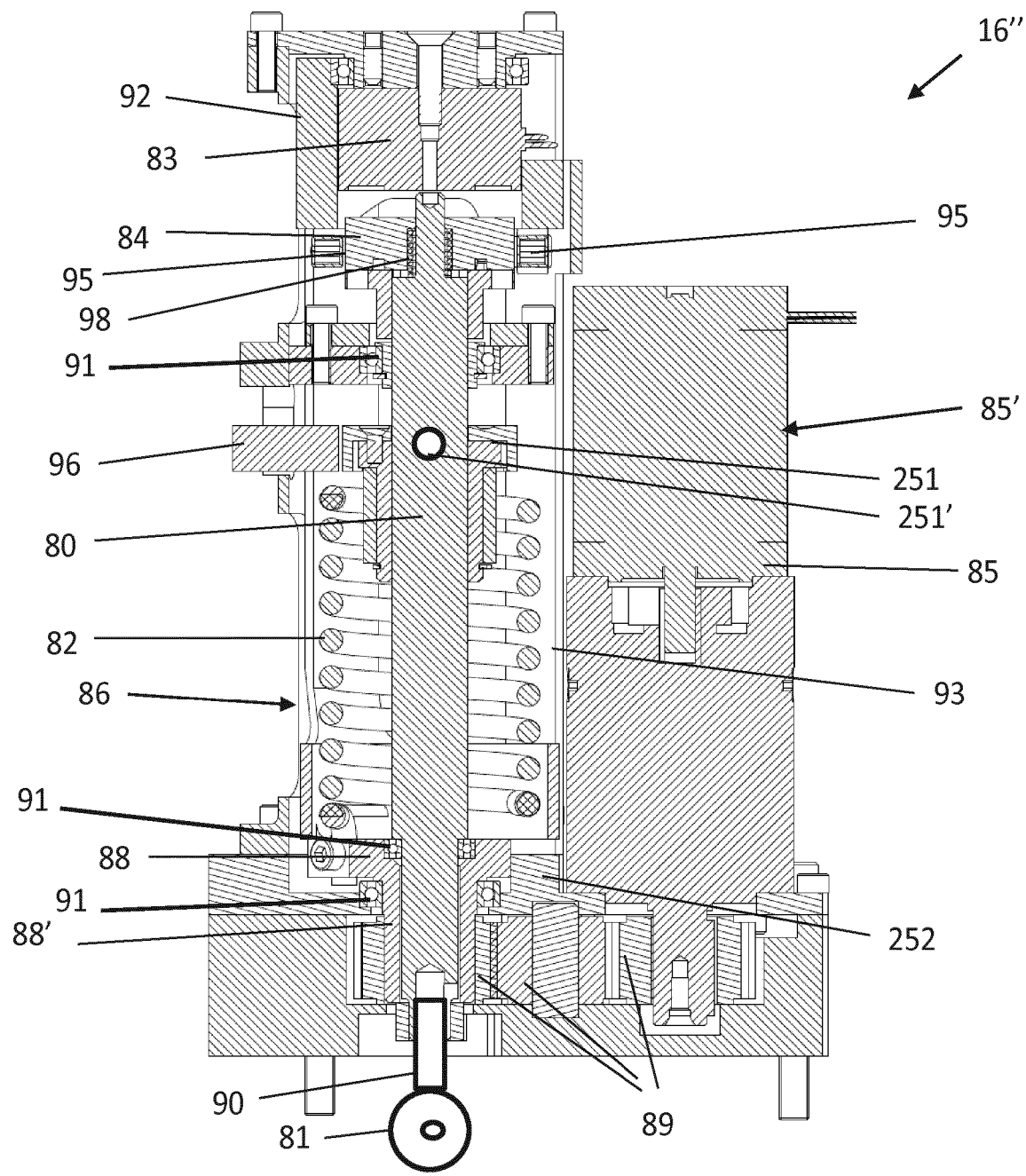
FIG. 7A is a cross section along a vertical plane and shows a component overview of a second embodiment of the invention powered by an electric input—Quick Dump Actuator (QDA)—single shaft.

FIG. 7A is a cross section along a vertical plane and shows a component overview of a second embodiment of the invention powered by an electric input—Quick Dump Actuator (QDA)—single shaft. The components of FIGS. 6 and 7A will be described in relation to operational sequence described in FIGS. 7B-7G below. The specific position in the respective operational sequence of FIGS. 6 and 7A is after the power has been lost and halfway through the release.

Figure 7D:
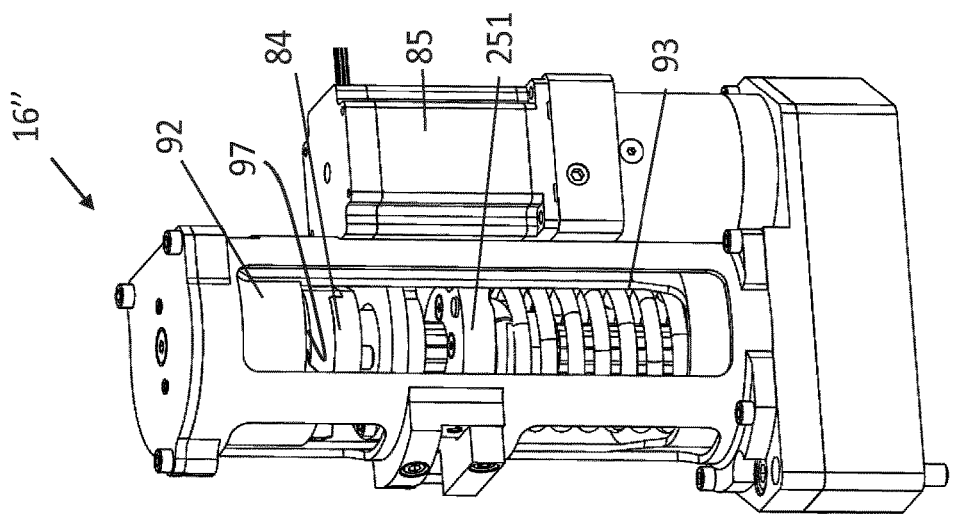
FIGS. 7B-7G show an example of an operational sequence according to the second embodiment of the invention, and the components mutual positions in different sequences of the actuator.
Figure 7C:
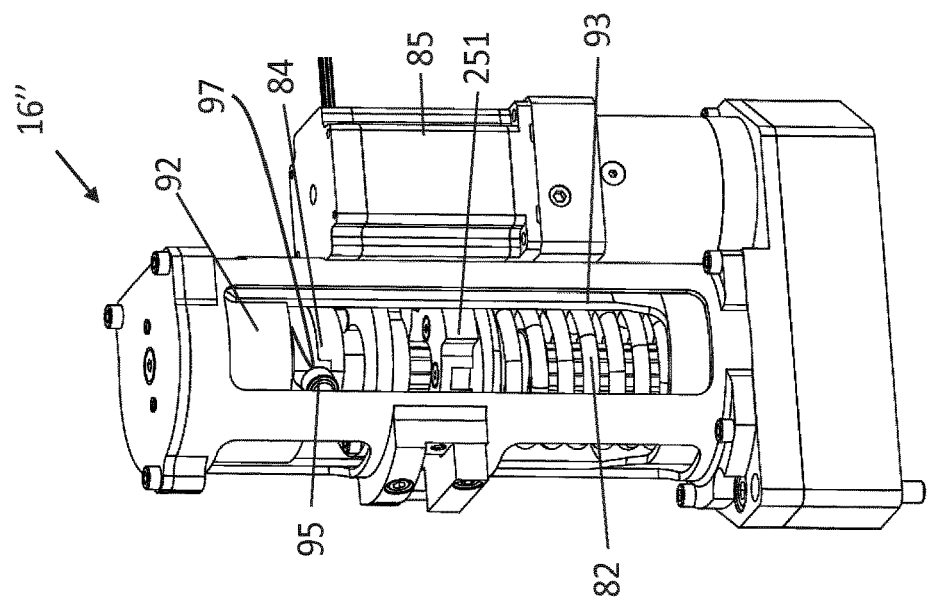
Figure 7B:
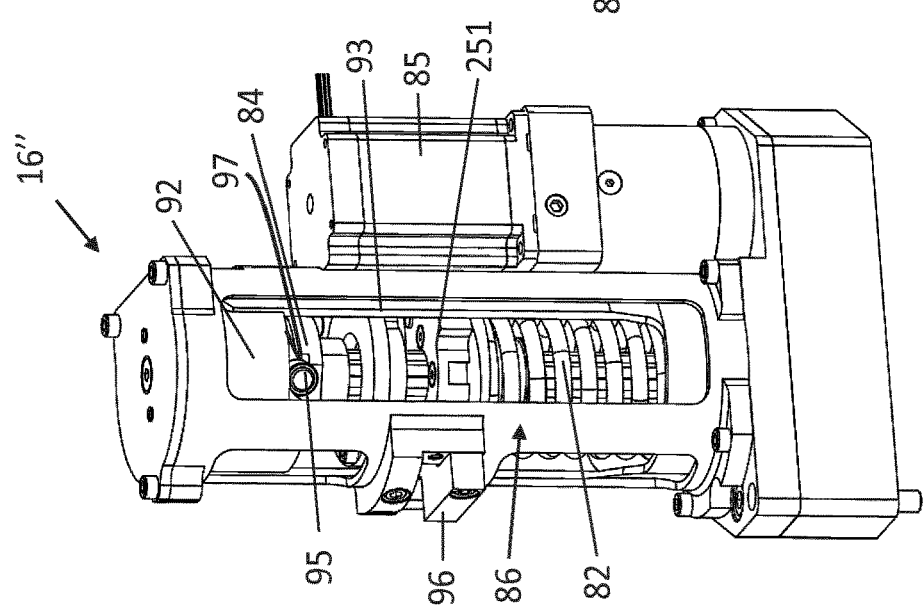

FIGS. 7B-7G shows an example of an operational sequence according to the second embodiment of the invention, and the components mutual positions in different sequences of the actuator, and more specific:

FIG. 7B: Production mode, electric power is on.

FIG. 7C: Disconnection, electric power is lost, the electromagnet releases magnet armature plate.

FIG. 7D: Ventilated, the first biasing element forces valve to turn and the system is ventilated. Electric power will now be restored.

Figure 7E:
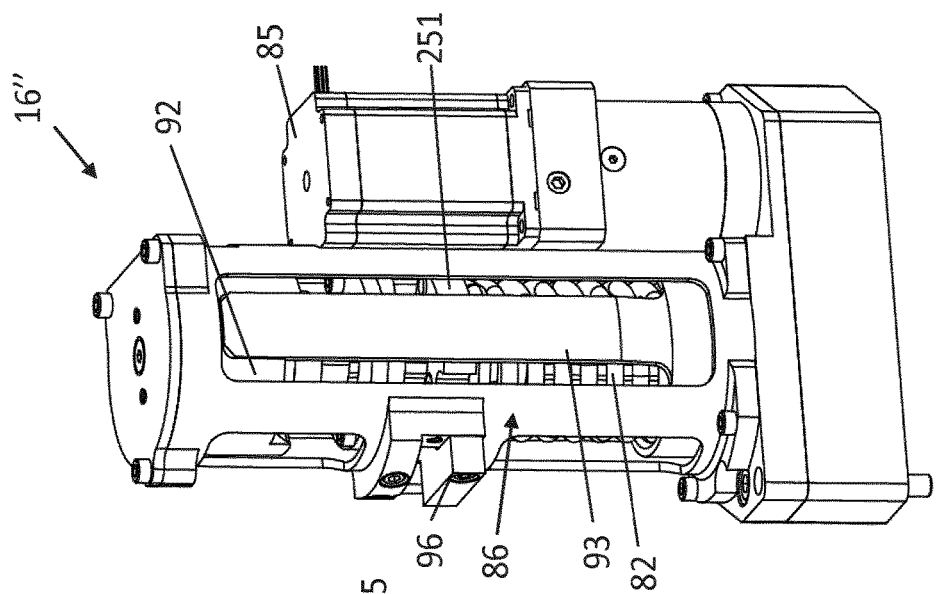
Figure 7F:
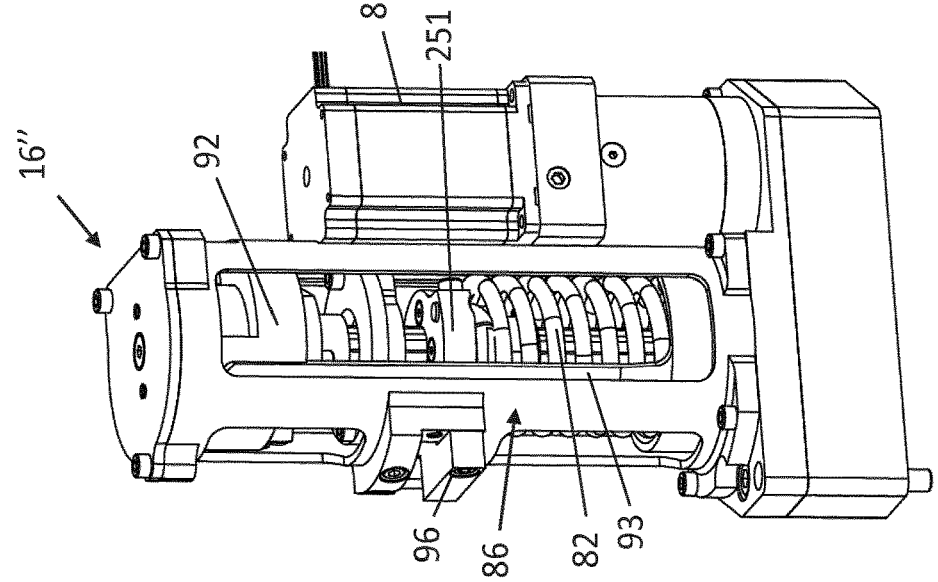

FIG. 7E-7F: First biasing element is tensioned by motor. Power is on. The magnet armature plate engages with electromagnet when aligned.

Figure 7G:
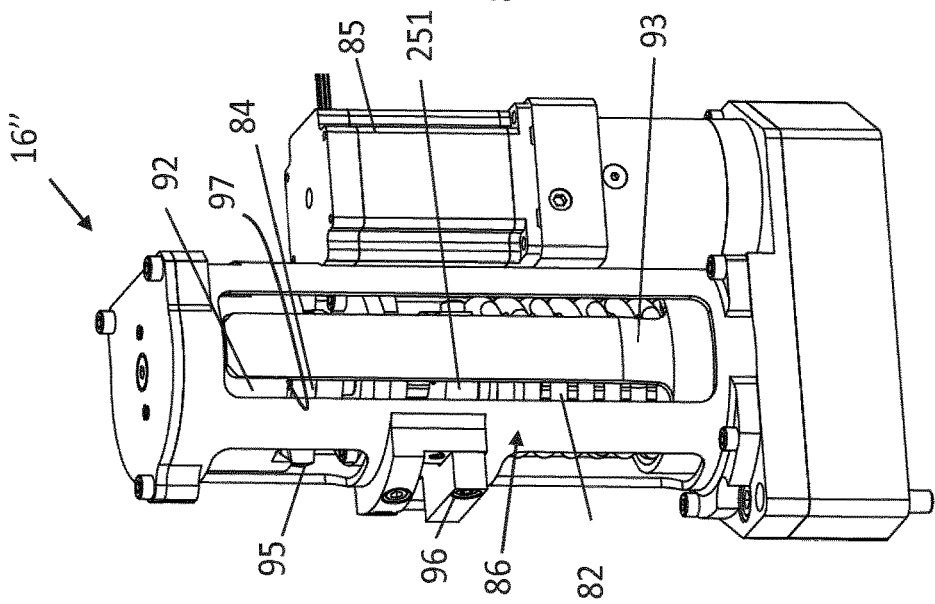

FIG. 7G: Resetting. Motor turns first biasing element and valve in one movement.

The operational sequence described below in relation to the second embodiment is valid for the first embodiment as well, as there are only minor differences between the first and second embodiments. The quick dump actuator 16" according to the second embodiment is powered by an electric input force and comprises one shaft 80.

In the second embodiment the subsea rotating component 81 is a rotating valve, the first biasing element 82 is a rotatable spiral spring, the holding element 83 is an electromagnet, the rotatable stem is a single shaft 80, the force transmitting arrangement is magnet armature 84 plate rotatably locked to the single shaft 80.

In the first embodiment (see FIG. 6) the subsea rotating component 81 is a rotating valve, the first biasing element 82 is a rotatable spiral spring, the holding element 83 is an electromagnet, the rotatable stem is combination of shaft 80', lower shaft extension 80", middle shaft 250 and magnet armature plate 84 with rotatably locked parts, the force transmitting arrangement is magnet armature plate 84 rotatably locked to the shaft 80' and lower shaft extension 80".

The functioning of the actuator in the second embodiment is, similar to the first embodiment, the presence of a first biasing element 82 in the form of the spiral spring which can be pre-tensioned by rotating a first end of the spring relative a second end of the spring, thereby the first biasing element 82 is pre-tensioned to be able to rotate an element (such as a rotating valve 81) connected to the first biasing element 82.

The actuator 16" comprises a motor 85 arranged to operate the rotating valve 81 to rotate. The motor 85 is in operational relationship with the rotating valve 81 and is, in at least one pre-tensioned position of the actuator 16", adapted to provide a rotational force action on the rotating valve 81. Similarly, the first biasing element 82 together with the force transmitting arrangement is, at least in one pre-tensioned position of the actuator 16", arranged to operate the valve 81 to rotate. Therefore, both the motor 85 and the first biasing element 82 are operable to rotate the valve 81, however, only one of the motor 85 and the first biasing element 82 is operable to rotate the valve at the time. If the actuator 16" is in a position where the motor 85 can operate the valve 81, the first biasing element 82 is also in a position where it can operate the valve 81. Furthermore, the motor 85 is allowed to operate the valve 81 to open when the actuator 16" is in a first pretensioned position (the first biasing element 82 has been pretensioned) and in a second pre-tensioned position (i.e. a production mode of the actuator 16"), as well as in any positions between the first and second pretensioned positions, when an input force is present. Thus, the system provides for a fail-safe function preventing the motor 85 to accidentally operate the valve 81.

The actuator 16" comprises a housing 86.

The motor 85 is disclosed arranged in a dedicated motor housing 85' outside the actuator housing 86.

The actuator further comprises a rotatable plate 88 arranged within the housing 86. The rotatable plate 88 is rotatably locked to the motor 85 via a set of transition gears 89 and follows rotational movement (in both directions) of the motor 85 through e.g. a key way connection to the transition gear 89. An axial extension 88' of the rotatable plate 88 is fully enclosed by one of the transition gears 89, however this is not necessary for the function of the actuator 16" provided that the transition gear 89 and the rotatable plate 88 is in a rotational locked relationship. A lower part of the single shaft 80 extends through the rotatable plate 88 and the transition gear 89 and is freely movable in the rotational direction relative the rotatable plate 88 and the transition gear 89 enclosing the rotatable plate 88. The rotatable plate 88, the single shaft 80 and the transition gear 89 enclosing the rotatable plate 88 have a common center axis. This common center axis is formed by the single shaft 80 extending from one end of the actuator housing 86 (e.g.

to the electromagnet 83 arranged at an upper end of the housing 86) to a valve coupling 90 connected to the valve 81 arranged in the opposite end of the single shaft 80. The single shaft 80 is stationary in the axial direction and is formed with a spline interface (not shown in FIG. 7A, but see FIGS. 7B-7G) on at least parts of its outer surface in contact with the magnet armature plate 84. The magnet armature plate 84 has corresponding spline interface (not shown) on an inner surface thereof to form a spline connection with the single shaft 80. The spline connection locks the magnet armature plate 84 to the single shaft 80 in the rotational direction but allows for axial relative movement between the magnet armature plate 84 and the single shaft 80. The valve coupling 90, the single shaft 80 and the magnet armature plate 84 are thus locked to each other in the rotational direction, but are allowed to move relative each other in the axial direction. Upper and lower bearings 91 are provided at appropriate positions along the shaft 80, respectively, to allow and support relative axial movement of the parts.

Figure 7H:
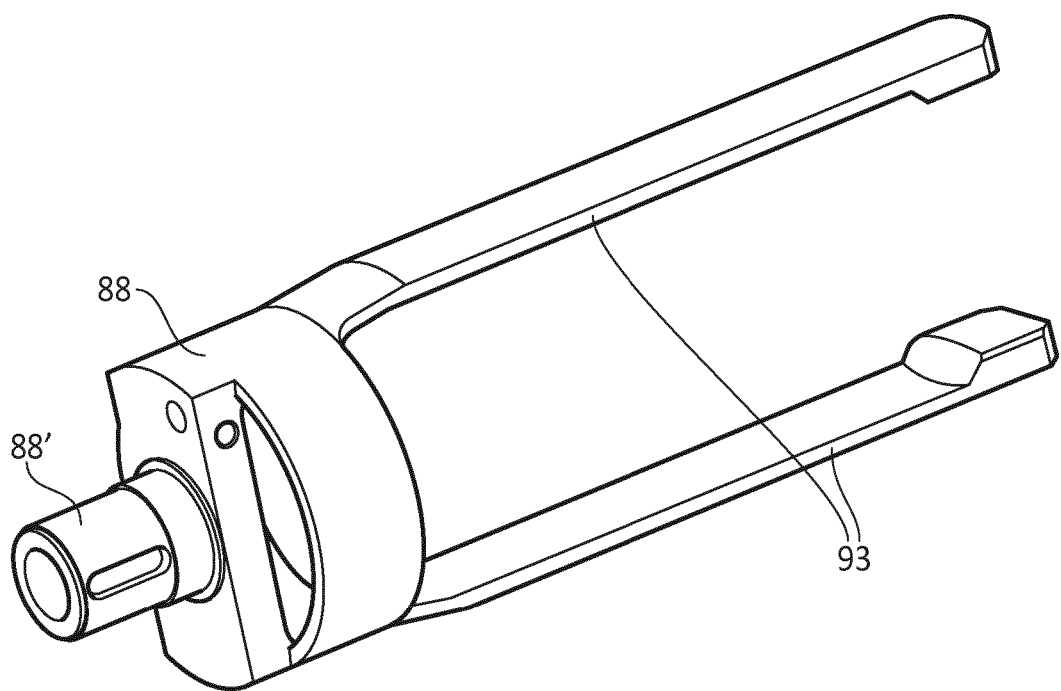
FIG. 7H shows details of a rotatable plate, axial extension of the rotatable plate and a cylindrical element.

The rotatable plate 88 is connected to a clutch ring 92 via an outer cylindrical element 93. However, the rotatable plate 88 and cylindrical element 93 can be formed in one piece. Preferably, the rotatable plate 88 and the cylindrical element 93 form a pitch fork shape (see FIG. 7H). Thus, any rotational movement of the rotatable plate 88 will rotate the outer cylindrical element 93 and the clutch ring 92. The operational relationship between the rotatable plate 88, the outer cylindrical element 93 and the clutch ring 92 can be considered as one common piece which is operationally connected both in axial and rotational directions. Furthermore, the clutch ring/outer cylindrical element 92, 93 comprises a guiding surface 97 for guiding a roller bearing 95 arranged on the magnet armature plate 84. The clutch ring 92 surrounds the electromagnet 83 and an upper portion of the magnet armature plate 84 in the first and second pre-tensioned positions of the actuator.

The rotatable plate 88 is further fixedly connected to a first end of the first biasing element 82 (e.g. lower end of the first biasing element) such that any rotational movement of the rotatable plate 88 is transferred to the first biasing element. The rotatable plate is configured such that it is prevented from rotation by any other components except the motor 85. The connection to the transition gears 89 provides for this.

A second end of the first biasing element 82 (e.g. upper end of first biasing element) is fixedly connected to the magnet armature plate 84 directly or via an upper shaft/upper spring fastening plate 251 rotatably locked but axially movable relative the magnet armature plate 84, in a manner such that any rotational movement of an upper part of the first biasing element 82 is transferred to the magnet armature plate 84, and vice versa.

The first biasing element 82 is arranged inside the housing and encloses the single shaft.

The second end of the first biasing element 82 (e.g. upper end), and thus the magnet armature plate 84, is rotationally locked to the valve 81. Consequently, if the magnet armature plate 84 and the second end of the first biasing element 82 rotate, the valve 81 rotates.

The first biasing element 82 is pre-tensioned by rotation, i.e. through relative rotational movement of the magnet armature plate 84 (which is fixedly connected to the second end of the first biasing element 82) and the rotatable plate 88 (which is fixedly connected to the first end of the first biasing element 82).

The actuator housing 86 is further provided with a fixed end stop 96 for the second end of the first biasing element 82 and the magnet armature plate 84, i.e. an end stop 96 for a stop element 251' on an upper shaft/upper spring fastening plate 251. The upper shaft/upper spring fastening plate 251 has a spline interface towards the single shaft 80 such that it can move axially relative the single shaft 80 and transfer rotational movements to the single shaft 80 (and thereby the valve).

The magnet armature plate 84 comprises at least one roller bearing 95 extending in the radial direction for interaction with the guiding surface 97 on the clutch ring/outer cylindrical element. Thus, the roller bearing(s) 95 on the magnet armature plate 84 moves along the guiding surface(s) 97 when the magnet armature plate 84 moves relative the clutch ring/outer cylindrical element 92, 93. The guiding surface 97 is preferably formed as a groove which comprises a first portion forming an angle of 0 degrees with a horizontal plane transverse to the single shaft and a second portion forming an angle of 60 degrees with the horizontal plane in the disclosed embodiment in the Figures. The second portion extends in a direction towards the clutch ring. The total length of the first and second portions are preferably ¼ of a full circle, i.e. 90 degrees.

The end stop 96 for the rotational movement of the stop element 251' on the upper shaft/upper spring fastening plate 251, the magnet armature plate 84, and thus the roller bearing 95, is formed in the actuator housing 86.

In all positions of the elements forming part of the actuator, the valve is not moved in the axial direction and is only operated to rotate.

The actuator 16" further comprises a holding element 83 in the form of an electromagnet arranged in one end of the housing 86 (e.g. at the upper end, at the same end as the clutch ring 92 and magnet armature plate 84). The input force to the electromagnet 83 is by means of electricity from a subsea installation or a remote location such as a floating or fixed installation, or from land. When the electromagnet is electrically powered, the electromagnet creates a magnetic field attracting the magnet armature plate 84 towards the electromagnet 83. The size, strength and direction of the magnetic field is dependent on the sizes of electromagnet and the magnet armature plate 84, the voltage and current of the input force, and is adapted to the requirements in each specific project.

The electromagnet 83, in a production mode of the actuator 16" (see FIG. 7B) represented by the second pre-tensioned position of the actuator 16", is adapted to receive an input force in the form electrical power. The force transmitting arrangement, i.e. the combination of the electromagnet 83 and the magnet armature plate 84, functions such that the electromagnet 83 attracts the magnet armature plate 84 towards itself (i.e. in a direction towards the electromagnet 83) in any position of the actuator. However, due to the presence of the guiding surface 97, the magnet armature plate 84 is only allowed to connect with the electromagnet 83 when the roller bearing 95 on the magnet armature plate 84 is in the second portion of the guiding surface of the housing 86. A second biasing element 98 may be provided to assist in the engagement of the magnet armature plate 84 with the electromagnet 83.

Alternatively, the presence of the second biasing element 98 may be superfluous if the strength of the electromagnet 83 is of a sufficient size to attract the magnet armature plate 84 without further assistance.

Once electric power is on, the force of the electromagnet 83 is larger than any forces from the first biasing element 82 acting on the magnet armature plate 84 thereby the valve 81 is held in production mode.

However, once electric power to the electromagnet 83 is lost (see FIGS. 7B, 7C, 7D), the electromagnet 83 does not provide enough holding force, thereby the force from the pre-tensioned first biasing element 82 is the largest, and forces the magnet armature plate 84 out of engagement with the electromagnet 83 and the first biasing element 82 rotates the magnet armature plate 84 along the guiding surface 97 rotating the valve 81 e.g. 90 degrees until the upper end of the first biasing element 82 abuts the end stop 96 of the housing 86. During this release mode of the actuator 16", the rotatable plate 88 is not rotating because it is prevented from rotation by an end stop in a base plate 252 (see FIG. 7A (and FIG. 6 for first embodiment)). The first biasing element 82 has now released at least some of its stored pre-tensioned force represented by e.g. a 90 degrees rotation of the second end (in the disclosed embodiment: the upper end) of the first biasing element 82 relative the first end (in the disclosed embodiment: lower end) of the first biasing element 82. The valve 81 is now in a position representing a dumping/venting position of the valve 81 and the actuator 16" is in the release position.

When electric power is restored (with reference to FIGS. 7E and 7F) the motor 85 operates the transition gears 89 to rotate the rotatable plate 88, the outer cylindrical element 93 (rotatable plate 88 and cylindrical element 93 can be seen as one piece) and the clutch ring 92 in the same direction and the same rotational distance as the second end of the first biasing element 82 and the magnet armature plate 84 rotated during the release procedure described above. The first biasing element 82 has now been pre-tensioned because the first end of the first biasing element 82 has been rotated relative the second end of the first biasing element 82 and the magnet armature plate 84 (the second end of the first biasing element 82 is prevented from rotation during this operation of the motor 85 due to its abutment against the end stop 96). Simultaneous, during rotation of the clutch ring 92 and the outer cylindrical element 93, the roller bearing 95 on the magnet armature plate 84 has been guided on the guiding surface 97, and when entering the final part of the rotation movement, the roller bearing 95 enters the second portion of the guiding surface 97, thereby the magnet armature plate 84 engages with the electromagnet 83 (FIG. 7F). The actuator 16" is now in a position representing a first pre-tensioned position. The components of the actuator 16" are, however, offset relative the position before the release position of the actuator (i.e. at an offset position equal to the rotation of the first biasing element, e.g. 90 degrees, relative the position in the production mode—also named second pre-tensioned position). This situation is shown in FIG. 7G.

The valve 81 has not been operated as a result of entering this first pre-tensioning position of the actuator 16" because the valve 81 only rotates when the magnet armature plate 84 is in engagement with the electromagnet 83. In order to restore the components of the actuator to return to the position representing a production mode or second pre-tensioned position, the motor 85 may now operate the valve 81 (because the magnet armature plate 84 is in engagement with the electromagnet 83 such that the motor 85 is allowed to operate the valve 81) to rotate in the opposite direction such that all of the components (magnet armature plate 84, cylindrical element 93, rotatable plate 88, first biasing element 82 etc.) that have been rotated during the release and or first pre-tensioned position of the actuator are rotated to the position they had before release (the position of FIG. 7B). The actuator is now in production mode, and the first biasing element 82 is pre-tensioned to operate the valve 81 to dump upon loss of electric power.

Figure 8A:
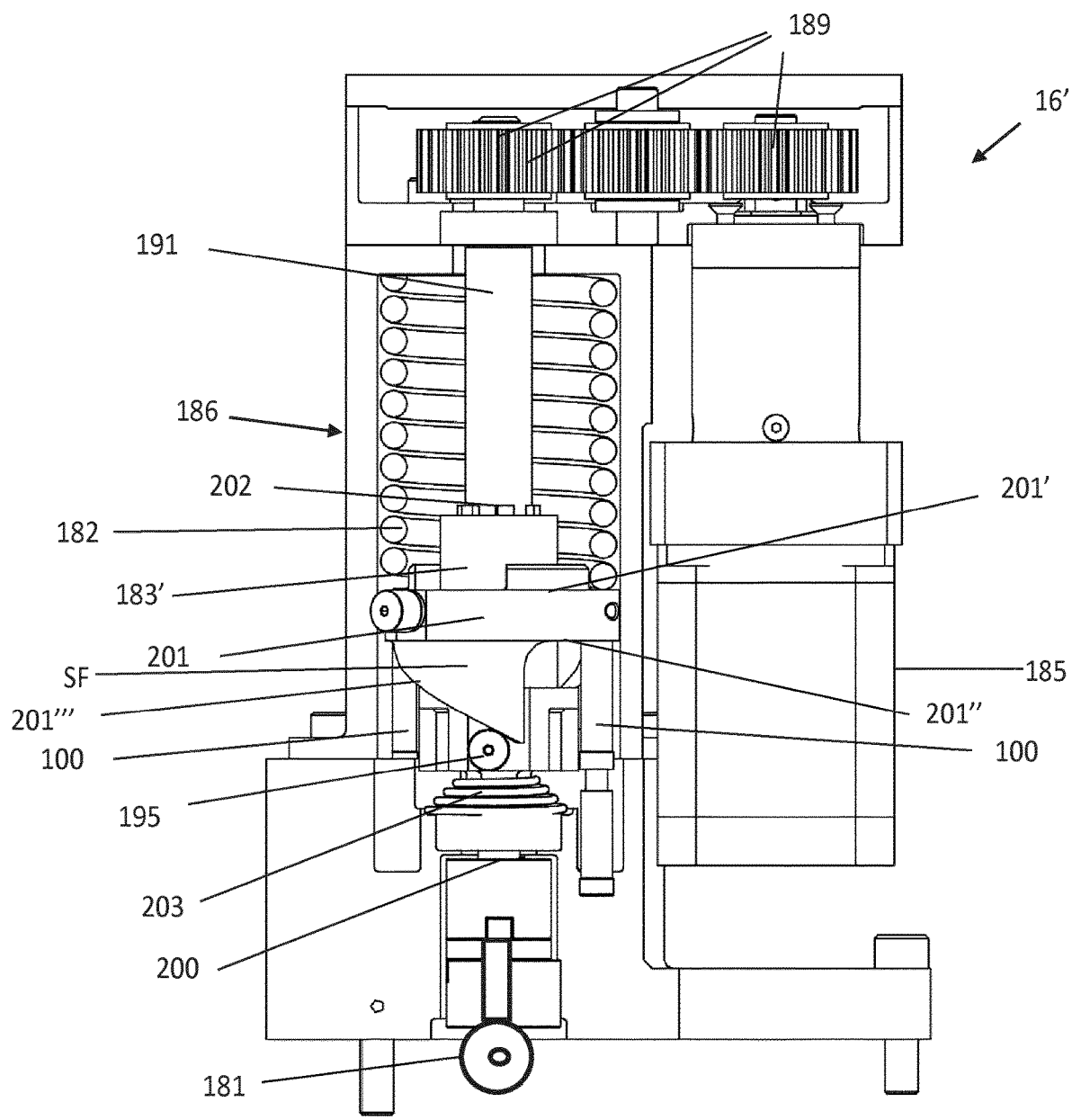
FIG. 8A is a cross section along a vertical plane and shows a component overview of a third embodiment of the invention hydraulically powered—Hydraulic Dump Actuator (HDA)—multiple shafts.

FIG. 8A is a cross section along a vertical plane and is a component overview of a third embodiment of the invention hydraulically powered—Hydraulic Dump Actuator (HDA)—multiple shafts.

FIGS. 8B-8G shows an example of an operational sequence according to the third embodiment of the invention, and the components mutual positions in different sequences of the actuator, and more specific:

FIG. 8B: Production mode, supply pressure is larger than a minimum pressure.

FIG. 8C: Disconnection, supply pressure decreasing, the electromotor is mechanically disconnected.

FIG. 8D: Ventilated, the first biasing element forces valve to turn and the system is ventilated.

FIG. 8E: First biasing element is tensioned. The supply pressure is larger than a minimum pressure and tensions the first biasing element.

FIG. 8F: Latching. Hollow cylinder aligns with the spline connection of the motor axle mechanically connecting the electromotor.

FIG. 8G: Resetting. Motor turns valve in one movement.

FIGS. 8B-8G shows an example of an operational sequence according to the third embodiment of the invention, and the components mutual positions in different sequences of the actuator 16'.

The actuator 16' according to the third embodiment is hydraulically powered by a hydraulic fluid pressurizing pistons 100 in the actuator 16'.

The system comprises a first biasing element 182 in the form of a compressed spiral spring which is compressed in a direction parallel to a center axis of the spring. A motor 185 is arranged to operate the rotating valve 181 to rotate. The motor 185 is in operational relationship with the rotating valve 181 and is, in at least one pre-tensioned position of the actuator 16', adapted to provide a force acting on the valve 181, preferably a rotational force. Similarly, the first biasing element 182 together with a force transmitting arrangement is, at least in one pre-tensioned position of the actuator 16', arranged to operate the valve 181 to rotate.

In the third embodiment the subsea rotating component 181 is a rotating valve, the first biasing element 182 is a compressible spiral spring, the holding element 183 is the combination of fluid pressurizing piston(s) 100 and a hollow cylinder 183', the rotatable stem 200 is an additional shaft rotatably locked to the rotating valve 181, the force transmitting arrangement is a movement converter device 201 operable to provide a rotating motion to roller bearings 195 on the hollow cylinder 183'.

The actuator 16' comprises a housing 186 preferably formed with recesses (not shown) for guiding and stabilization of various components housed inside the housing.

The motor 185 is arranged outside the actuator housing 186. The motor 185 is connected to a motor axle 191, typically via one or more gears 189. The gears 189 transfer rotational or linear forces or movements from the motor 185 to the motor axle 191. A first end portion of the motor axle 191 may be directly coupled to the motor 185 or, may as in the disclosed embodiment, be connected to the motor 185 via the one or more of the gears 189. The motor axle 191 is preferably a rigid circular cylinder-shaped solid metal shaft having a fixed length. The motor axle 191 is allowed to rotate when subjected to an input rotational force from the motor 185 but is prevented from movement in the axial direction. A second end portion of the motor axle 191, which second end portion is not in contact with the motor 185 or gears 189, is provided with a spline interface 202 on the outer radial surface thereof. The spline interface 202 may comprise one or more recesses or protrusions evenly divided at predetermined positions on the outer radial surface of the motor axle 191.

The hollow cylinder 183' is arranged extending along the same center axis as the motor axle 191 and is provided with a spline interface (not shown, on inner surface of the hollow cylinder 183') with protrusions or grooves, respectively, to mate with the spline interface 202 on the motor axle 191, thereby forming a first spline connection. Furthermore, the hollow cylinder 183' is thus locked in the rotational direction with the motor axle 191 by the spline connection when the first spline connection is connected. However, the spline configuration of the first spline connection allows axial relative movement between the motor axle 191 (motor axle is fixed) and the hollow cylinder 183' such that the hollow cylinder 183' is allowed to move axially relative the motor axle 191 out of splined connection with the motor axle 191 and thereby rotate freely relative the motor axle 191 and motor 185. Thus, when the first spline connection between the motor axle 191 and the hollow cylinder 183' is connected, the motor 185 and the stem 200 (and thereby the valve) is rotatably coupled.

The hollow cylinder 183' has one or more roller bearings 195 on a radial outer surface thereof for interaction with the force transmitting arrangement, e.g. movement converter device 201, which interaction will be described in greater detailed below.

It is preferably an additional shaft with a common center axis as the center axis of the motor axle 191 arranged at an extension of the motor axle 191 inside the hollow cylinder 183'. This additional shaft 200 is rotatably locked with the valve element 181 (e.g. ball valve) and is provided with a second spline connection (not shown) towards an inner surface of the hollow cylinder, thereby being arranged in a rotational locking engagement with the hollow cylinder 183', in all axial relative positions between the additional shaft 200 and the hollow cylinder 183'. The additional shaft 200 is preferably supported by bearings allowing some vertical and radial travel to compensate for any minor un-equality or unevenness between the different components of the actuator.

The stem, i.e. the additional shaft 200, and the rotating valve 181 is connected such that they are fixedly connected when rotating and movable relative each other in the axial direction. This may be achieved e.g. by the spline connection between the additional shaft 200 and the valve 181.

The actuator 16' further comprises a holding element 100 in the form of a piston arrangement. The piston(s) 100 in the piston arrangement, in a production mode of the actuator 16' represented by the second pre-tensioned position of the actuator, is adapted to receive an input force in the form of a fluid pressure, such as a pilot hydraulic pressure from a hydraulic system or a pilot pressure from a production flow. This fluid pressure pushes the piston(s) 100 towards a force transmitting arrangement in the form of a movement converter device 201. The movement converter device 201 has a first surface 201' in contact with the first biasing element 182 and a second surface 201" in contact with the piston(s) 100, which second surface 201" is opposite the first surface 201'. The movement converter device 201 is, when subjected to a pressure from the first biasing element 182 which is larger than the pressure exerted by the fluid on the second surface adapted to transfer a linear movement of the first biasing element 182 to a rotational movement of the hollow cylinder 183' (i.e. the stem 200 and thereby the valve 181). This transition from linear movement of the spring 182 to rotational movement of the hollow cylinder 183', i.e. the stem 200, is possible due to the configuration of the movement converter device 201 cooperating with at least one roller bearing 195 fixed to a radial outer surface of the hollow cylinder 183' thereby being in rotational and axial connection with the hollow cylinder 183'. The hollow cylinder 183' is either directly or indirectly connected to the additional shaft 200 and rotationally locked but axially movable relative the additional shaft 200 (and thereby the valve 181).

The configuration and relationship between the hollow cylinder 183' and the movement converter device 201, in a preferred embodiment, has the shape of a shark fin extending in an axial direction, i.e. a direction towards the roller bearings 195 on the hollow cylinder 183'. The shark fin shape is characterized in that it is adapted to interact with the roller bearing 195 and provides a guide surface 201''' for the roller bearing 195 forcing the roller bearing 195 with the hollow cylinder 183' to rotate (e.g. 90 degrees). The shark fin is, in one aspect, a protrusion which has a curved right-angled triangle form where the shape of the curve is preferably 90 degrees of a full circle. When comparing with a right-angled triangle of the shark fin SF FIG. 8A, the right angle of the triangle is one of the two angles which the triangle forms with the second surface of the movement converter device 201, whereas the hypotenuse forms the guiding surface 201''' on which the roller bearing 195 with hollow cylinder 183' (and thereby the stem 200 is guided, rotating the valve 181).

The presence of the force transmitting arrangement, i.e. the movement converter device 201 and first biasing element 182, prevent the motor 185 to operate the valve 181 unintentionally when the actuator 16' is in the released position. The motor 185 is able to operate the valve 181, i.e. in mechanical connection with the valve 181, when the force of the fluid pressurizing the piston(s) 100 on the second end 201" of the movement converter device 201 overcome the force from the first biasing element 182 acting on the opposite first end 201' of the movement converter device 201. Thus, the system has a built-in safety function preventing the motor 185 to operate the valve 181 unconsciously or by mistake unless the movement converter device 201 and first biasing element 182 are in a position represented by the first pre-tensioned position of the actuator 16'.

In order to assist in connecting the spline connection 202 of the hollow cylinder 183' to the spline connection of the motor axle 191, i.e. mating the first spline connection, there may be arranged a second biasing element 203 which may be compressed and released in a direction parallel to the center axle of the motor axle 191, which second biasing element 203 is compressed when the first biasing element 182 is forcing the movement converter device 201 and the hollow cylinder 183' downwardly upon loss of pressure from the fluid acting on the pistons 100 under actuation of the valve 181 to a dumping position. When regaining pressure in the fluid, the second biasing element 203 is arranged to assist in the mating of the first spline connection, i.e. the spline connection between the hollow cylinder 183' and the motor axle 191. Alternatively, instead of using the second biasing element 203, it is possible to provide the force transmitting arrangement, i.e. the movement converter device 201, with a collar or similar on the inner surface to interact with a recess or groove on an outer surface of the hollow cylinder such that the movement converter device, upon regaining fluid pressures in the piston(s), is adapted to move the hollow cylinder, and thus the spline connection of the hollow cylinder, towards and into connection with the spline connection on the motor axle thereby forming the first spline connection. In both alternatives, the second spline connection between the valve 181 and the additional shaft 200 (and thereby the hollow cylinder 183') is always connected in rotational direction but allowed to move in the axial direction.

In all positions of the elements forming part of the actuator 16', the valve 181 is not moved in the axial direction and is only operated to rotate.

Then the different operation modes of the actuator 16' will be described with reference to the elements described above, including:

Release position (fluid pressure to piston 100 is lost, first biasing element 182 not pre-tensioned, valve 181 is in dumping position, also named base mode), First pre-tensioned position (fluid pressure to piston 100 is restored, first biasing element 182 is pre-tensioned, valve 181 is in dumping position, also named tensioning mode)

Second pre-tensioned position (fluid pressure to piston 100 is restored, first biasing element 182 is pre-tensioned, also named production mode and activated mode)

When the fluid pressure in the pistons 100 is lost (see FIG. 8C), the force of the first biasing element 182 on the first end 201' of the movement converter device 201 is larger than the force from the combined force of the piston(s) 100 and the second biasing element 203 acting on the opposite second end 201" of the movement converter device 201 (via the hollow cylinder 183 and the roller bearings 195) thereby the compressed spring 182 (first biasing element) pushes the shark fin SF of the movement converter device 201 against the roller bearings 195 on the hollow cylinder 183' axially (e.g. +/−5 mm) such that the hollow cylinder 183' is released from the first spline connection with the motor axle 191. Now the valve 181 is disconnected from the motor 185. The hollow cylinder 183', and thereby the rotatably locked valve 181, is, due to the release of the first spline connection, allowed to rotate together. The first biasing element 182 pushes the movement converter device 201 further down axially such that the roller bearings 195 follows the shape of the shark fin SF and rotates the valve 181 to a dumping position (see FIG. 8D) (for example 90 degrees rotation over an axial extension of 20 mm), representing by a released position of the actuator 16'.

Once the fluid pressure is restored in the piston(s) 100 (see FIG. 8E), the force of the piston(s) 100 on the second end 201" of the movement converter device 201 is larger than the pressure from the first biasing element 182 acting on the opposite first end 201' of the movement converter device 201, thereby compressing the first biasing element 182. Simultaneously, the second biasing element 203 pushes the hollow cylinder 183' axially such that the first spline connection between the motor axle 191 and the hollow cylinder 183' is connected (see FIG. 8F). During this operation, the valve 181 has not been operated and is in the dumping position. Then the first biasing element 181 is pre-tensioned and actuator 16' is tensioned to perform the fail-safe function of the valve once the valve 181 is re-set to a production mode. This particular position with tensioned first biasing element 182 and valve 181 in dumping/venting position represents a first pre-tensioned position of the actuator 16'.

The motor 185 is now operated to rotate the hollow cylinder 185 in the opposite direction than during release (i.e. in the direction opposite the shark fins SF), and thereby the valve 181, to the production mode of the actuator 16' (see FIG. 8B). This position is representing a second pre-tensioned position of the actuator 16'. Now the actuator 16' is returned to its production mode and the first biasing element 182 is pre-tensioned to operate the valve 181 to dump/vent upon loss of fluid pressure to the piston(s) 100/cylinder(s).

Details of the fourth embodiment will be described in relation to FIGS. 9A-1, 9A-2, 9B-1, 9B-2 and 9C-9G.

Figure 1:
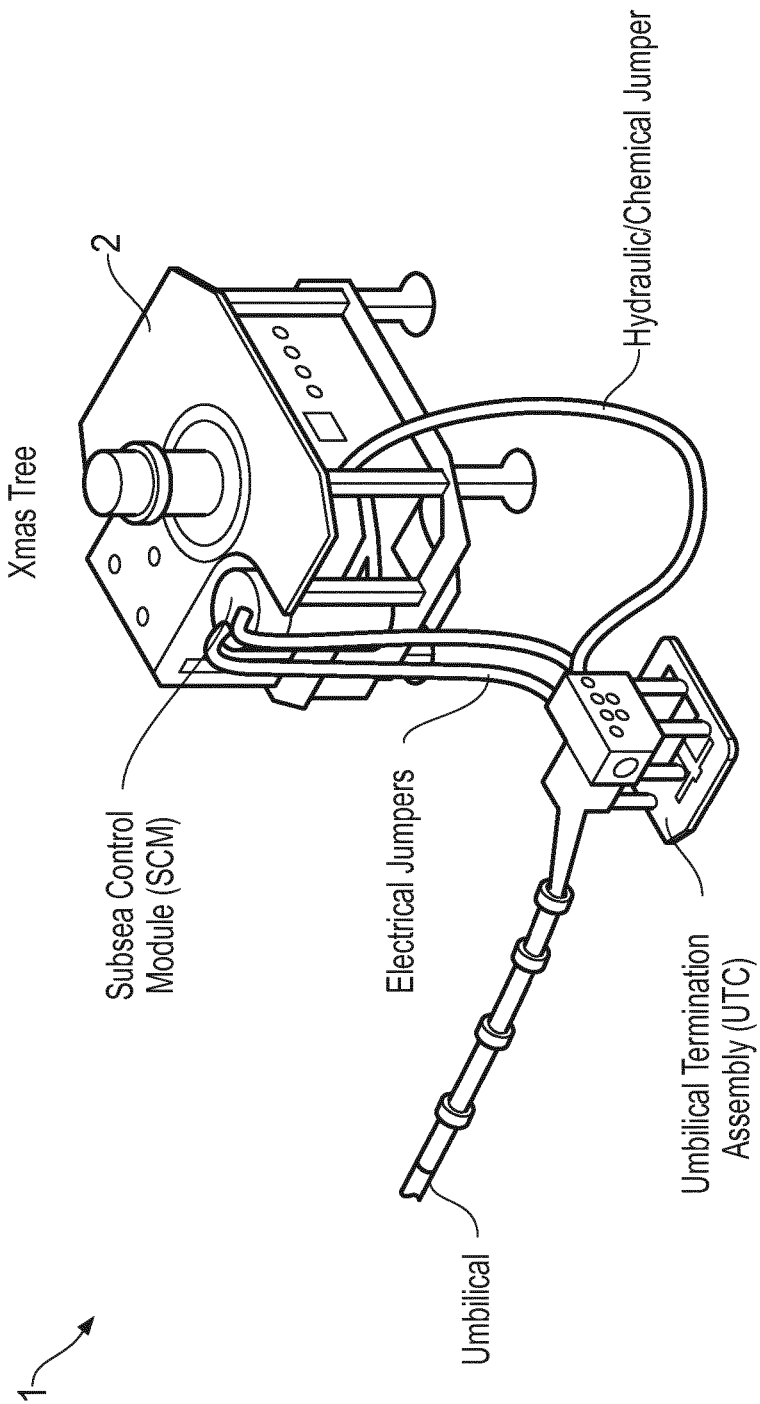
FIG. 1 illustrates a part of a prior art oil/gas installation.
Figures 1, 9A:
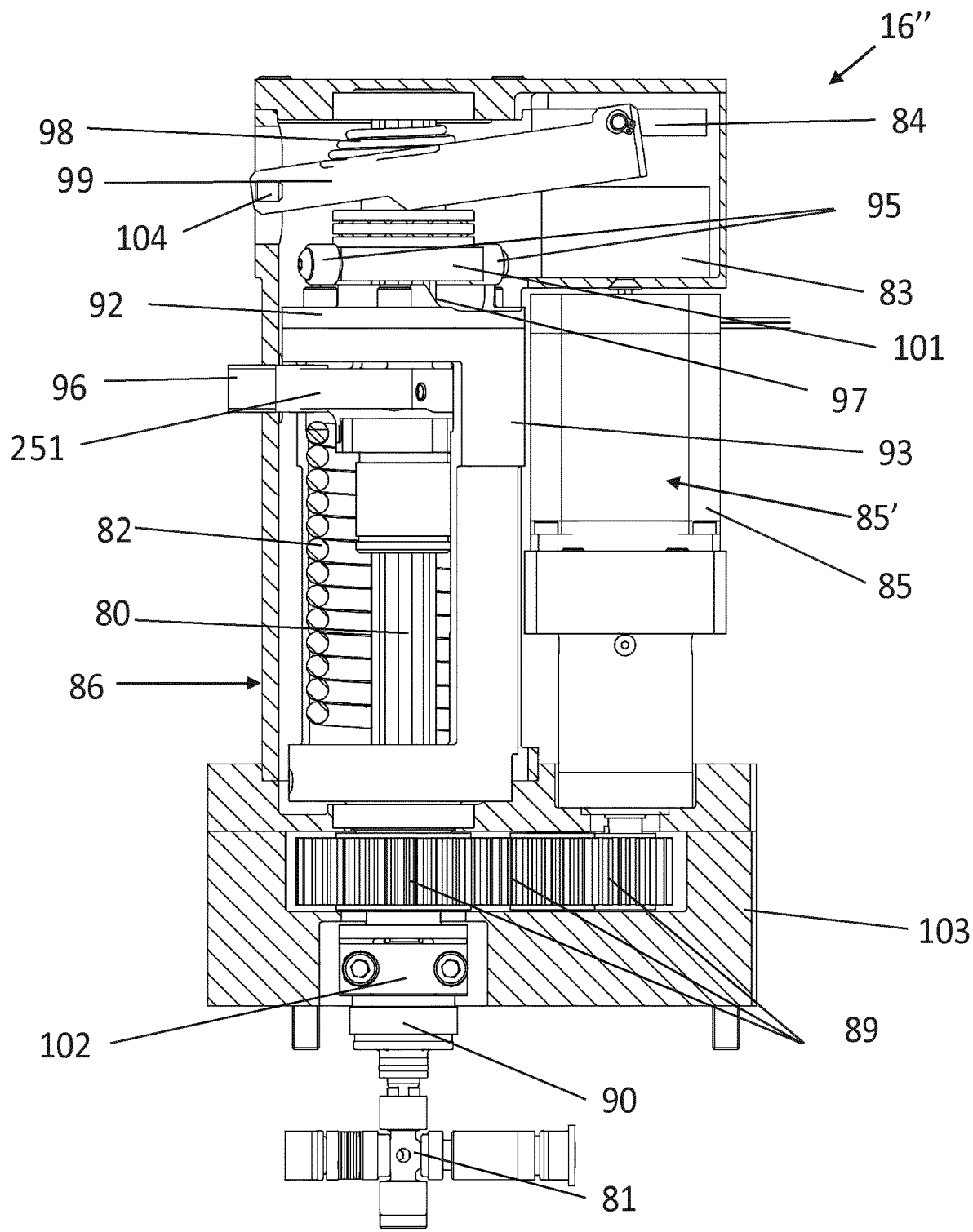
Figures 2, 9A:
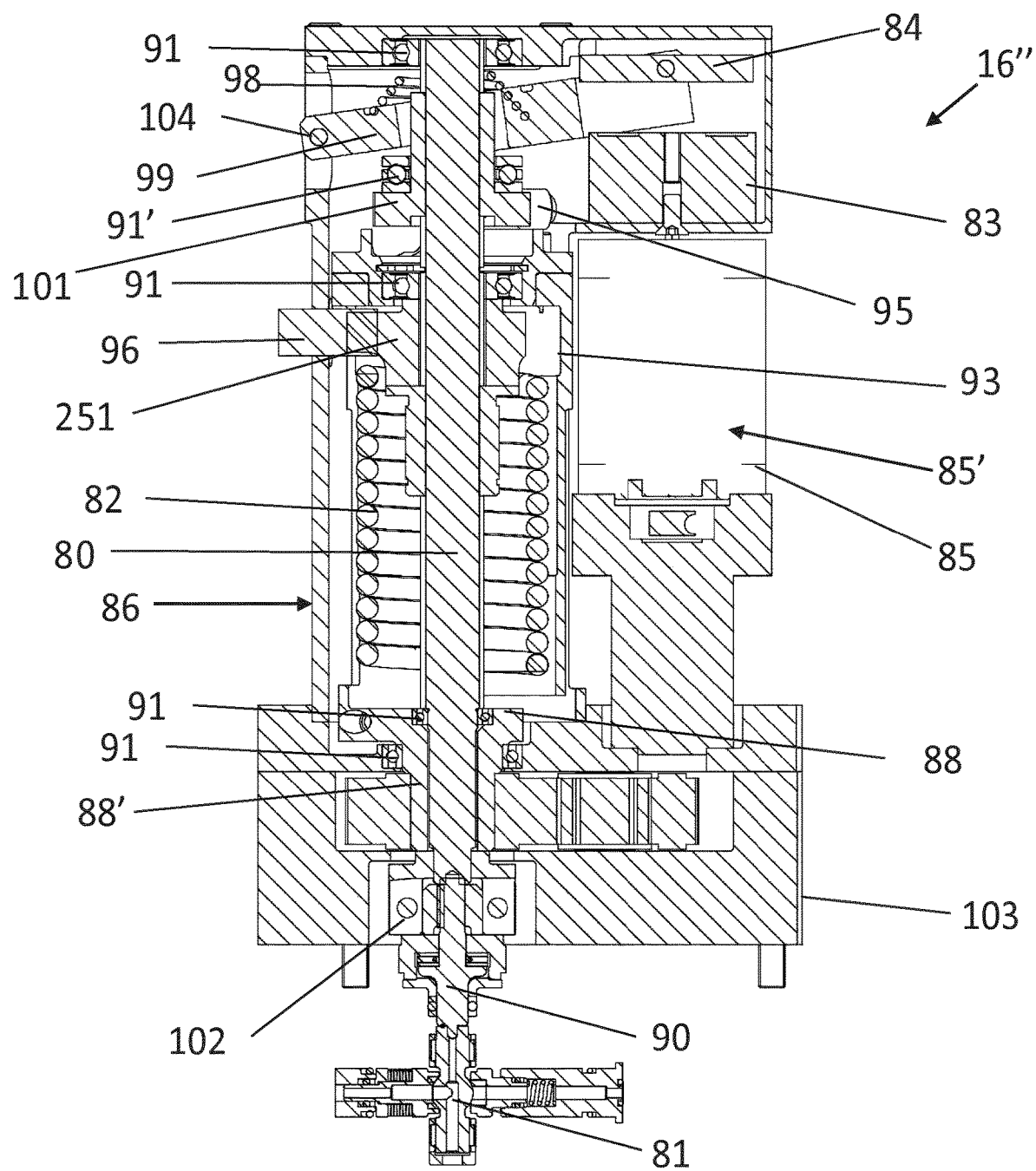

The specific position in the respective operational sequence of FIGS. 9A-1, 9A-2 is after the power has been lost in a fully ventilated position.

Figures 1, 9B:
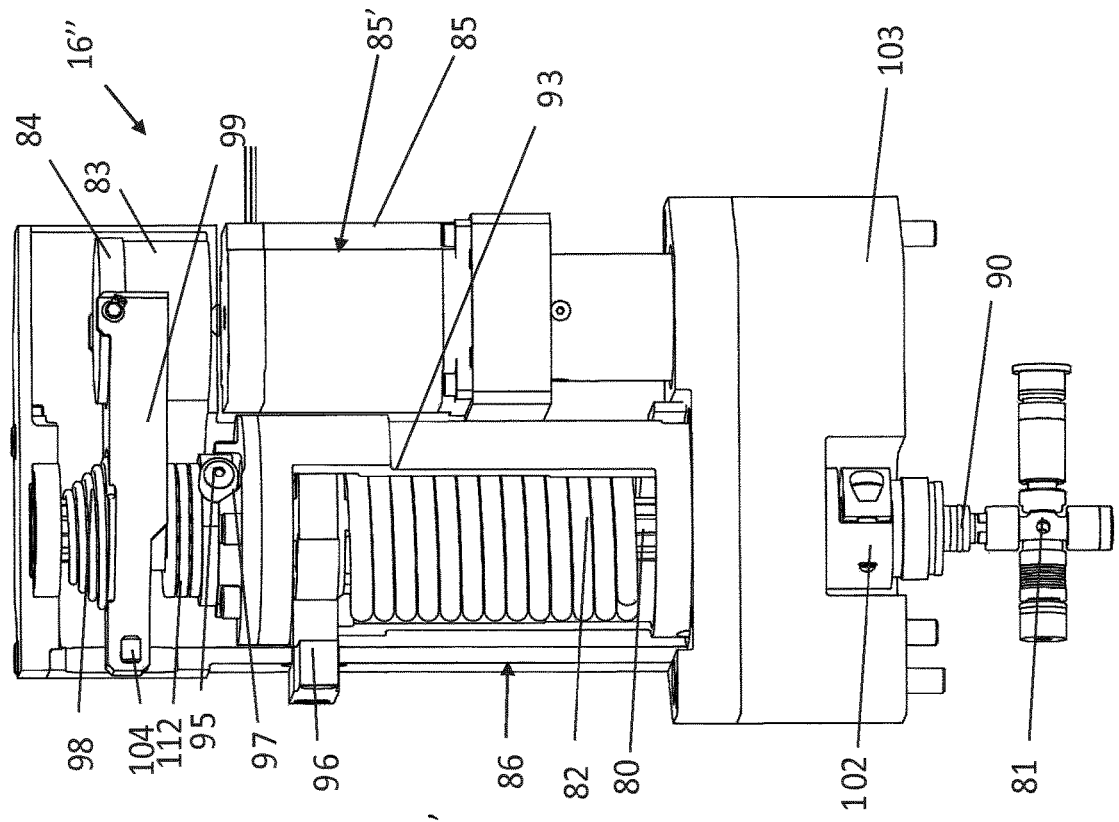
Figures 2, 9B:
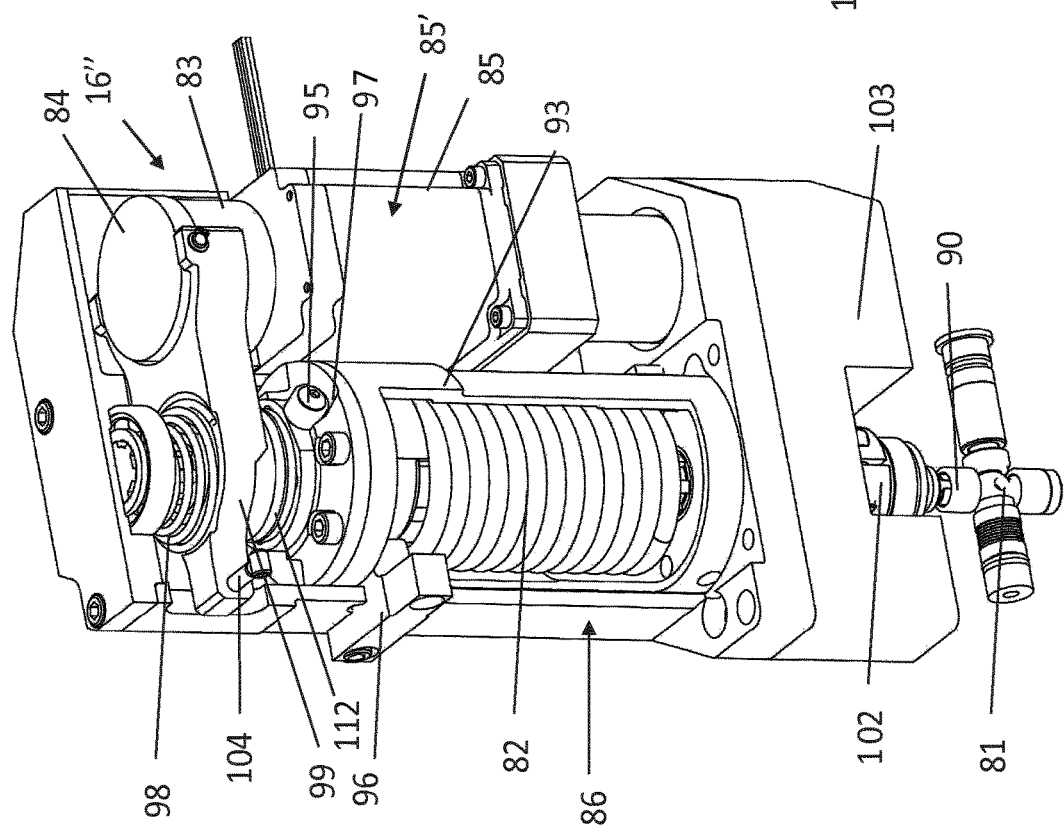
Figure 9F:
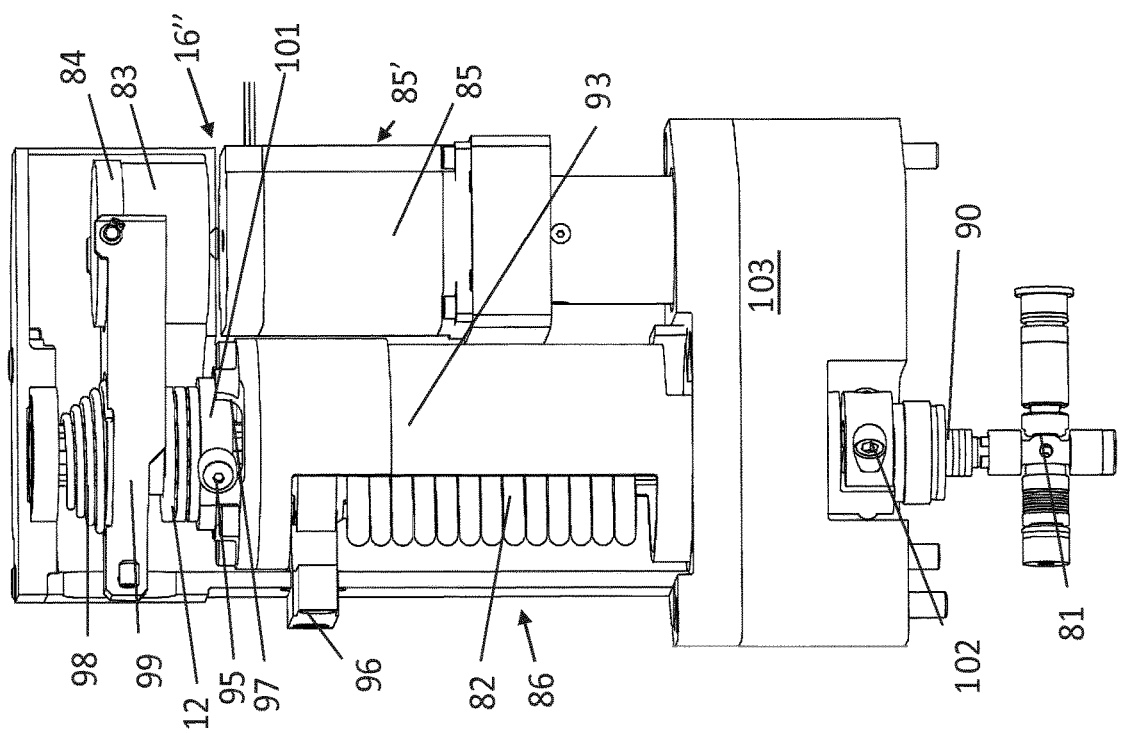
Figure 9G:
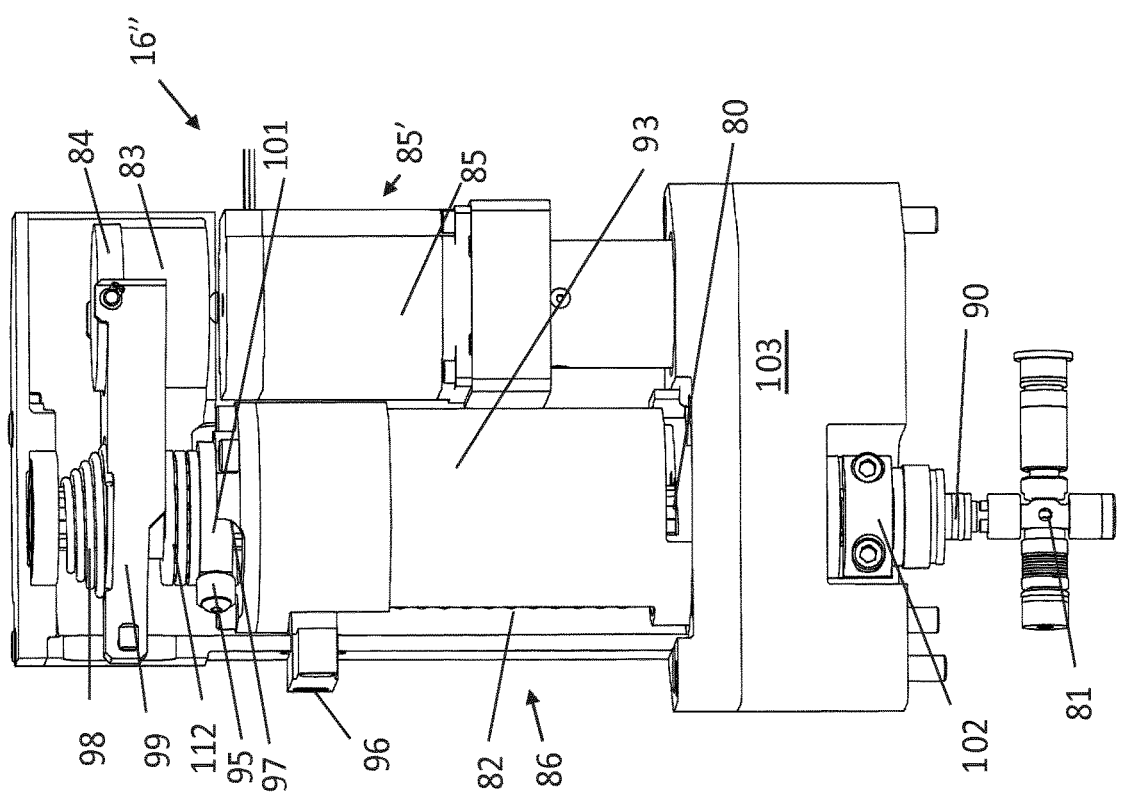

FIGS. 9B-1-9G shows an example of an operational sequence according to the fourth embodiment of the invention, and the components mutual positions in different sequences of the actuator, and more specific:

FIGS. 9B-1 and 9B-2: Production mode, electric power is on.

FIG. 9C: Disconnection, electric power is lost, the electromagnet releases magnet armature plate.

FIG. 9D: Ventilated, the first biasing element forces valve to turn and the system is ventilated. Electric power will now be restored.

FIG. 9E-9F: First biasing element is tensioned by motor. Power is on. The magnet armature plate engages with electromagnet when clutch lever where the magnet armature plate is supported is rotated towards magnet.

FIG. 9G: Resetting. Motor turns first biasing element and valve in one movement.

The operational sequence described in relation to the first and second embodiments are valid for the fourth embodiment as well, as there are only minor differences between the first/second embodiments and the fourth embodiment. The quick dump actuator 16" according to the fourth embodiment is powered by an electric input force and comprises one shaft 80.

In the fourth embodiment (see FIGS. 9A-1 and 9A-2) the subsea rotating component 81 is a rotating valve, the first biasing element 82 is a rotatable spiral spring, the holding element 83 is an electromagnet, the rotatable stem is combination of shaft 80 and magnet armature plate 84 with rotatably locked parts, the force transmitting arrangement is magnet armature plate 84 connected to clutch lever 99 which is pivotally connected to the actuator housing 86 and manipulatable by splined clutch sleeve 101 into connection/disconnection with electromagnet 83.

The functioning of the actuator 16" in the fourth embodiment is, similar to the first and second embodiments, the presence of a first biasing element 82 in the form of the spiral spring which can be pre-tensioned by rotating a first end of the spring relative a second end of the spring, thereby the first biasing element 82 is pre-tensioned to be able to rotate an element (such as a rotating valve 81) connected to the first biasing element 82.

The actuator 16" comprises a motor 85 arranged to operate the rotating valve 81 to rotate. The motor 85 is in operational relationship with the rotating valve 81 and is, in at least one pre-tensioned position of the actuator 16", adapted to provide a rotational force action on the rotating valve 81. Similarly, the first biasing element 82 together with the force transmitting arrangement is, at least in one pre-tensioned position of the actuator 16", arranged to operate the valve 81 to rotate. Therefore, both the motor 85 and the first biasing element 82 are operable to rotate the valve 81, however, only one of the motor 85 and the first biasing element 82 is operable to rotate the valve at the time. If the actuator 16" is in a position where the motor 85 can operate the valve 81, the first biasing element 82 is also in a position where it can operate the valve 81. Furthermore, the motor 85 is allowed to operate the valve 81 to open when the actuator 16" is in a first pretensioned position (the first biasing element 82 has been pre-tensioned) and in a second pre-tensioned position (i.e. a production mode of the actuator 16"), as well in any positions between the first and second pretensioned positions, when an input force is present. Thus, the system provides for a fail-safe function preventing the motor 85 to accidentally operate the valve 81.

The actuator 16" comprises a housing 86.

The motor 85 is disclosed arranged in a dedicated motor housing 85' outside the actuator housing 86.

The actuator 16" further comprises a rotatable plate 88 arranged within the housing 86. The rotatable plate 88 is rotatably locked to the motor 85 via a set of transition gears 89 and follows rotational movement (in both directions) of the motor 85 through e.g. a key way connection to the transition gear 89. The transition gears 89 are arranged in a transition gear housing 103. An axial extension 88' of the rotatable plate 88 is fully enclosed by one of the transition gears 89, however this is not necessary for the function of the actuator 16" provided that the transition gear 89 and the rotatable plate 88 is in a rotational locked relationship. A lower part of the single shaft 80 extends through the rotatable plate 88 and the transition gear 89 and is freely movable in the rotational direction relative the rotatable plate 88 and the transition gear 89 enclosing the rotatable plate 88. The rotatable plate 88, the single shaft 80 and the transition gear 89 enclosing the rotatable plate 88 have a common center axis. This common center axis is formed by the single shaft 80 extending from an upper end of the actuator housing 86 to a valve coupling 90 connected to the valve 81 arranged in the opposite end of the single shaft 80. The single shaft 80 is stationary in the axial direction and is formed with a spline interface (see e.g. FIG. 9A-1) on at least parts of its outer surface in contact with the splined clutch sleeve 101. The splined clutch sleeve 101 has corresponding spline interface (not shown) on an inner surface thereof to form a spline connection with the single shaft 80. The spline connection locks the splined clutch sleeve 101 to the single shaft 80 in the rotational direction but allows for axial relative movement between the splined clutch sleeve 101 and the single shaft 80. The valve coupling 90, the single shaft 80 and the splined clutch sleeve 101 are thus locked to each other in the rotational direction, but are allowed to move relative each other in the axial direction. Upper and lower bearings 91 are provided at appropriate positions along the shaft 80, respectively, to allow and support relative axial movement of the parts.

The rotatable plate 88 is connected to a clutch ring 92 via an outer cylindrical element 93. However, the rotatable plate 88 and cylindrical element 93 can be formed in one piece. Preferably, the rotatable plate 88 and the cylindrical element 93 form a semi-cylindrical axial extending wall extending from the periphery of the rotatable plate 88 and in an axial direction of the cylindrical element. In a preferred embodiment, the wall covers at least 180 degrees of the cylindrical element. Thus, any rotational movement of the rotatable plate 88 will rotate the outer cylindrical element 93 and the clutch ring 92. The operational relationship between the rotatable plate 88, the outer cylindrical element 93 and the clutch ring 92 can be considered as one common piece which is operationally connected both in axial and rotational directions. Furthermore, the clutch ring/outer cylindrical element 92, 93 comprises a guiding surface 97 for guiding a roller bearing 95 arranged on splined clutch sleeve 101.

Figure 9H:
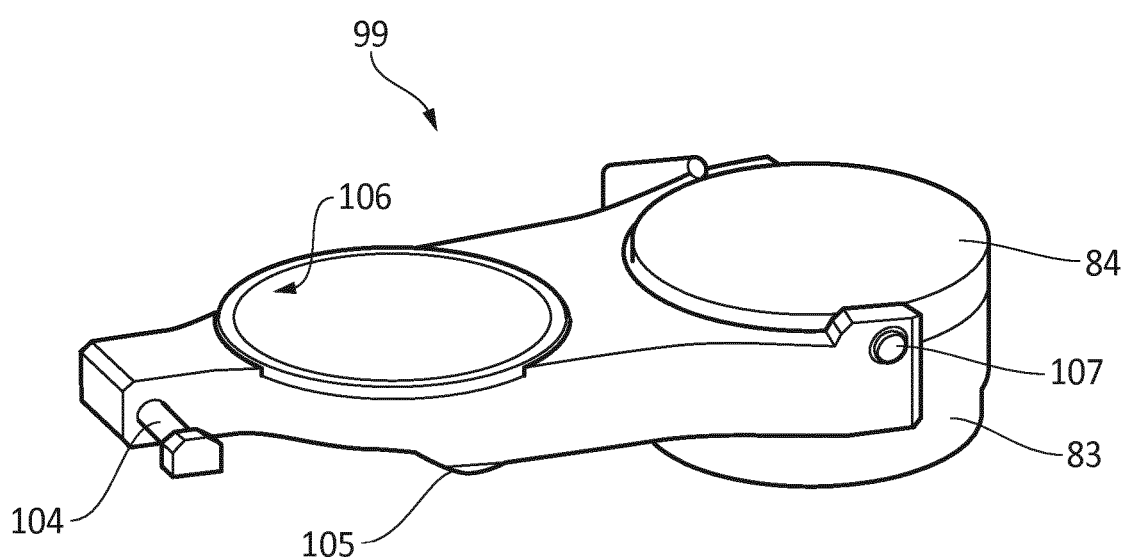
FIG. 9H shows an example of a clutch lever holding the magnet armature plate which may be used in the fourth embodiment of the invention.

Details of the clutch lever 99 connected to the electromagnet 83 is given in FIG. 9H. The clutch lever 99 is supporting the magnet armature plate 84 through a pin 107 and is pivotally connected through a pivot connection 104 to the actuator housing 86 (not shown in FIG. 9H). The clutch lever 99 comprises a through-going hole 106 for receiving the stem 80 (not shown in FIG. 9H).

The clutch lever 99 is provided with a protruding portion 105 on a lower surface thereof for interaction with splined clutch sleeve 101, possibly via a thrust bearing 112 (not shown in FIG. 9H). When the roller bearing 95 on the splined clutch sleeve 101 is not in contact with the guiding surface 97 on the clutch ring 92, the clutch lever 99 is in an inclined position relative to the mainly horizontal position shown in FIGS. 9C-9E. When the roller bearing 95 is in contact with the guiding surface 97 (see e.g. FIGS. 9F and 9G) the clutch lever 99 is no longer held in the inclined position (via thrust bearing 112) and the clutch lever 99 is allowed to rotate at the pivot connection 104 such that the magnet armature plate 84 in the distal end of the clutch lever 99 moves downwardly by gravity (and possibly assisted by a second biasing element 98) into connection with the electromagnet 83. Once connected, and power is on, the electromagnet 83 provides sufficient force for holding the magnet armature plate 84 connected to the electromagnet 83. This is the case during normal production mode.

The rotatable plate 88 is further fixedly connected to a first end of the first biasing element 82 (e.g. lower end of the first biasing element) such that any rotational movement of the rotatable plate 88 is transferred to the first biasing element 82. The rotatable plate 88 is configured such that it is prevented from rotation by any other components except the motor 85. The connection to the transition gears 89 provides for this.

A second end of the first biasing element 82 (e.g. upper end of first biasing element) is fixedly connected to the splined clutch sleeve 101 directly or via an upper shaft/upper spring fastening plate 251 rotatably locked but axially movable relative the splined clutch sleeve 101, in a manner such that any rotational movement of an upper part of the first biasing element 82 is transferred to the splined clutch sleeve 101, and vice versa.

The first biasing element 82 is arranged inside the housing and encloses the single shaft.

The second end of the first biasing element 82 (e.g. upper end), and thus the splined clutch sleeve 101, is rotationally locked to the valve 81. Consequently, if the splined clutch sleeve 101 and the second end of the first biasing element 82 rotate, the valve 81 rotates.

The first biasing element 82 is pre-tensioned by rotation, i.e. through relative rotational movement of the splined clutch sleeve 101 and the rotatable plate 88 (which is fixedly connected to the first end of the first biasing element 82).

The actuator housing 86 is further provided with a fixed end stop 96 for the second end of the first biasing element 82 and the splined clutch sleeve 101, i.e. an end stop 96 for a stop element 251' on an upper shaft/upper spring fastening plate 251. The upper shaft/upper spring fastening plate 251 has a spline interface towards the single shaft 80 such that it can move axially relative the single shaft 80 and transfer rotational movements to the single shaft 80 (and thereby the valve).

The splined clutch sleeve 101 comprises at least one roller bearing 95 extending in the radial direction for interaction with the guiding surface 97 on the clutch ring/outer cylindrical element. Thus, the roller bearing(s) 95 on splined clutch sleeve 101 moves along the guiding surface(s) 97 when the splined clutch sleeve 101 moves relative the clutch ring/outer cylindrical element 92, 93. The guiding surface 97 is preferably formed as a groove which comprises a first portion forming an angle of 0 degrees with a horizontal plane transverse to the single shaft and a second portion forming an angle of 60 degrees with the horizontal plane and a third portion forming an angle of 0 degrees with the same horizontal plane but staggered in an axial direction relative the first portion in the disclosed embodiment in the Figures. The second portion extends in a direction towards the clutch ring. The total length of the first and second portions are preferably ¼ of a full circle, i.e. 90 degrees, so a movement of 90 degrees will move the roller bearing from the first portion to the third portion.

The end stop 96 for the rotational movement of the stop element 251' on the upper shaft/upper spring fastening plate 251, the splined clutch sleeve 101, and thus the roller bearing 95, is formed in the actuator housing 86.

In all positions of the elements forming part of the actuator, the valve is not moved in the axial direction and is only operated to rotate.

The actuator 16" further comprises a holding element 83 in the form of an electromagnet 83 arranged parallel to the housing 86 and below the magnet armature plate 84. The input force to the electromagnet 83 is by means of electricity from a subsea installation or a remote location such as a floating or fixed installation, or from land. When the electromagnet is electrically powered, the electromagnet creates a magnetic field attracting the magnet armature plate 84 towards the electromagnet 83. The size, strength and direction of the magnetic field is dependent on the sizes of electromagnet and the magnet armature plate 84, the voltage and current of the input force, and is adapted to the requirements in each specific project.

The electromagnet 83, in a production mode of the actuator 16" (see FIGS. 9B-1 and 9B-2) represented by the second pre-tensioned position of the actuator 16", is adapted to receive an input force in the form electrical power. The force transmitting arrangement, i.e. the magnet armature plate 84 connected to clutch lever 99 which is pivotally connected to the actuator housing 86 and manipulatable by splined clutch sleeve 101 into connection/disconnection with electromagnet 83, functions such that the electromagnet 83 attracts the magnet armature plate 84 towards itself (i.e. in a direction downwardly towards the electromagnet 83) in any position of the actuator. However, due to the presence of the splined clutch sleeve 101 with roller bearing for guiding in guiding surface 97, the magnet armature plate 84 is only allowed to connect with the electromagnet 83 when the roller bearing 95 on the splined clutch sleeve 101 has entered and passed the second portion of the guiding surface 97 of the clutch ring 92. A second biasing element 98, arranged above, and in connection with the clutch lever 99, may be provided to assist in pushing the clutch lever 99 downwardly and rotate such that the magnet armature plate 84 moves downwardly and engages with the electromagnet 83. In addition to the second biasing element 98 and the attractive magnet power, gravity may assist in forcing the clutch lever 99 into engagement with the electromagnet 83. Alternatively, the presence of the second biasing element 98 may be superfluous if the strength of the electromagnet 83 assisted by gravity is of a sufficient size to attract the magnet armature plate 84 without further assistance.

Once electric power is on, the force of the electromagnet 83 is larger than any forces from the first biasing element 82 acting on the splined clutch sleeve 101 (and thus the magnet armature plate 84) thereby the valve 81 is held in production mode. However, once electric power to the electromagnet 83 is lost (see FIGS. 9B-1, 9B-2 9C, 9D), the electromagnet 83 does not provide enough holding force, thereby the force from the pre-tensioned first biasing element 82 is the largest, and forces the magnet armature plate 84 out of engagement with the electromagnet 83 and the first biasing element 82 rotates the splined clutch sleeve 101 along the guiding surface 97 rotating the valve 81 e.g. 90 degrees until the upper end of the first biasing element 82 abuts the end stop 96 of the housing 86. During this release mode of the actuator 16", the rotatable plate 88 is not rotating because it is prevented from rotation by an end stop in a base plate 252 (see FIGS. 9A-1, 9A-2). The first biasing element 82 has now released at least some of its stored pre-tensioned force represented by e.g. a 90 degrees rotation of the second end (in the disclosed embodiment: the upper end) of the first biasing element 82 relative the first end (in the disclosed embodiment: lower end) of the first biasing element 82. The valve 81 is now in a position representing a dumping/venting position of the valve 81 and the actuator 16" is in the release position.

When electric power is restored (with reference to FIGS. 9E and 9F) the motor 85 operates the transition gears 89 to rotate the rotatable plate 88, the outer cylindrical element 93 (rotatable plate 88 and cylindrical element 93 can be seen as one piece) and the clutch ring 92 in the same direction and the same rotational distance as the second end of the first biasing element 82 and the splined clutch sleeve 101 rotated during the release procedure described above. The first biasing element 82 has now been pre-tensioned because the first end of the first biasing element 82 has been rotated relative the second end of the first biasing element 82 and the splined clutch sleeve 101 (the second end of the first biasing element 82 is prevented from rotation during this operation of the motor 85 due to its abutment against the end stop 96). Simultaneous, during rotation of the clutch ring 92 and the outer cylindrical element 93, the roller bearing 95 on the splined clutch sleeve 101 has been guided on the guiding surface 97, and when entering the final part of the rotation movement, the roller bearing 95 enters the second portion of the guiding surface 97, thereby the splined clutch sleeve 101 moves downwardly, the clutch lever 99 is forced to pivot on the protruding portion 105 to a mainly horizontal position resulting in that the magnet armature plate 84 connected in the distal end moves downwardly towards and into engagement with the electromagnet 83 (FIG. 9F). The actuator 16" is now in a position representing a first pre-tensioned position. The components of the actuator 16" are, however, offset relative the position before the release position of the actuator (i.e. at an offset position equal to the rotation of the first biasing element, e.g. 90 degrees, relative the position in the production mode—also named second pre-tensioned position). This situation is shown in FIG. 7G.

The valve 81 has not been operated as a result of entering this first pre-tensioning position of the actuator 16" because the valve 81 only rotates when the magnet armature plate 84 is in engagement with the electromagnet 83 and the splined clutch sleeve 101 is rotationally locked to the single shaft 80 (via spline connection). In order to restore the components of the actuator to return to the position representing a production mode or second pre-tensioned position, the motor 85 may now operate the valve 81 (because the magnet armature plate 84 is in engagement with the electromagnet 83 such that the motor 85 is allowed to operate the valve 81) to rotate in the opposite direction such that all of the components (splined clutch sleeve 101, cylindrical element 93, rotatable plate 88, first biasing element 82 etc.) that have been rotated during the release and or first pre-tensioned position of the actuator are rotated to the position they had before release (the position of FIG. 9B-1, 9B-2). The actuator is now in production mode, and the first biasing element 82 is pre-tensioned to operate the valve 81 to dump upon loss of electric power.

As an alternative to the pivot connection 104, it is possible to provide this connection as a hydraulic connection, thereby providing a combined electro-hydraulic actuator. This may e.g. be done by arranging one or more hydraulically actuated cylinders with pistons extending in the axial direction of the actuator housing 86, wherein the cylinders may be configured to push, pull and/or otherwise force the clutch lever 99 downwardly at the rotational point (i.e. at the position of the pivot connection 104) when hydraulic pressure is present. Such a system may have advantages in that it provides for a fail-safe function as a result of either hydraulic pressure loss or electric loss in the same actuator. When hydraulic pressure is present and electric power is on, the pistons may be arranged to push the left hand side of the clutch lever 99 upwardly such that the opposite distal end with the magnet armature plate 84 is pivoted towards the electromagnet 83. This will represent a normal production mode. However, in the absence of either hydraulic pressure or electric power, the remaining force provided by the electromotor 83 or the hydraulic pressure (and possibly second biasing element 98) is not sufficient for keeping the actuator in normal production mode, thereby the force from the pre-tensioned first biasing element 82 is the largest, and forces the magnet armature plate 84 out of engagement with the electromagnet 83 and the first biasing element 82 rotates the splined clutch sleeve 101 along the guiding surface 97 rotating the valve 81.

In all four embodiments, the connection and/or interface between the stem and the rotating valve may comprise an adjusting device 102 for correcting any misalignment between a dumping/ventilation position and a production position for the valve 81. This may be advantageous in situations where the angle of the valve 81 between dumping/ventilation position and production position only allows for a few degrees of misalignment. The skilled person will understand how such a connection and/or interface can be made and will not be discussed any further herein.

Furthermore, a number of bearings 91, including thrust bearings 91' to support axial loads as well as rotational bearings to support rotational or torsion loads, may be arranged at dedicated positions between relative moving parts experiencing large forces.

In addition, the upper spring fastening plate 251 supporting the second end (e.g. upper end) of the first biasing element 82 is preferably of a larger relative diameter than the corresponding support provided by the rotatable plate 88 supporting the first end (e.g. lower end) of the first biasing element 82.

It should be recognized that, while the present invention has been described in relation to the preferred embodiments thereof, those skilled in the art may develop a wide variation of structural and operational details without departing from the principles of the invention as defined in the attached claims.

The invention claimed is:

1. A subsea actuator for actuating a subsea rotating component, comprising:
   a first biasing element;
   a motor;
   a holding element configured to receive an input force;
   a rotatable stem operatively connectable to the component;
   a force transmitting arrangement connectable to the first biasing element and the holding element;
   a first connection which in a first mode is configured to lock the stem in rotatable engagement with the motor and in a second mode is configured to unlock the stem from rotatable engagement with the motor and allow the stem to be influenced by the first biasing element;
   wherein the first biasing element and the stem are releasably connected via the force transmitting arrangement, such that when the first biasing element and the stem are released from each other, the first biasing element is configured to be pre-tensioned to a position representing a first pre-tensioned position of the actuator without operating the stem;
   wherein the holding element is configured to exert a holding force on the force transmitting arrangement and the first biasing element in the first pre-tensioned position;
   wherein, when the first biasing element and the stem are connected and the first biasing element is pre-tensioned, the first connection is in the first mode such that the motor is configured to operate the stem to a position representing a second pre-tensioned position of the actuator; and
   wherein, in the second pre-tensioned position, upon loss of input force to the holding element, the holding element is configured to release its holding force on the force transmitting arrangement and the first biasing element, thereby the first connection is unlocked to its second mode, such that the pre-tensioned first biasing element is released and rotates the stem to a position representing a release position of the actuator.

2. The subsea actuator according to claim 1, wherein the first biasing element is a spring.

3. The subsea actuator according to claim 1, wherein the actuator further comprises a second biasing element configured to assist in the connection of the first biasing element and the stem by pushing the force transmitting arrangement towards the holding element.

4. The subsea actuator according to claim 1, wherein the holding element is an electromagnet, the input force is electrical power and the force transmitting arrangement comprises a magnet armature plate, and wherein the electromagnet is configured to create a magnetic field and the magnet armature plate is of a material susceptible to influence from the magnetic field strong enough to hold the magnet armature plate in the second pre-tensioned position of the actuator, and wherein, upon loss of electric power to the electromagnet, the actuator is configured to automatically rotate the stem to the release position of the actuator by releasing pre-tensioned force of the first biasing element.

5. The subsea actuator according to claim 1, wherein the first biasing element is a spring which is connected to a rotatable plate at a first spring fastening point and to the magnet armature plate at a second spring fastening point on an upper shaft/upper spring fastening plate which is rotatably locked to the magnet armature plate, and wherein the spring and the stem, when connected, are configured to rotate together.

6. The subsea actuator according to claim 5, wherein the actuator further comprises an outer cylindrical element and a clutch ring rotatably locked to the rotatable plate, and wherein the cylindrical element or the clutch ring comprises a guiding surface for guiding a roller bearing which is rotationally fixed in position relative to the magnet armature plate.

7. The subsea actuator according to claim 4, wherein the actuator further comprises a second biasing element configured to assist in the connection of the first biasing element and the stem by pushing the force transmitting arrangement towards the holding element, and wherein the second biasing element is configured to push the magnet armature plate into engagement with the electromagnet.

8. The subsea actuator according to claim 1, wherein the holding element is a piston driven by a supply pressure, the force transmitting arrangement is a movement converter device in connection with a hollow cylinder, and the stem is an additional shaft rotatably locked to the rotating component, wherein the movement converter device in connection with the hollow cylinder is adapted to transfer a linear movement of the first biasing element into a rotational movement of the stem, wherein the supply pressure is configured to hold the movement converter device in the second pre-tensioned position of the actuator, and wherein, upon loss of supply pressure, the actuator is configured to automatically actuate the stem representing a release position of the actuator.

9. The subsea actuator according to claim 8, wherein the actuator enters the first pre-tensioned position when the supply pressure to the piston is restored.

10. The subsea actuator according to claim 3, wherein the second biasing element pushes the force transmitting arrangement towards the holding element via a clutch lever.

11. The subsea actuator according to claim 1, wherein the first biasing element is a spring which is connected to a rotatable plate at a first spring fastening point and to an upper spring fastening plate at a second spring fastening point, and wherein the spring and the stem, when connected, are configured to rotate together.

12. The subsea actuator according to claim 11, wherein the holding element is an electromagnet, the input force is electrical power and the force transmitting arrangement comprises a magnet armature plate which is attracted by the electromagnet when the electromagnet is energized, wherein the actuator further comprises an outer cylindrical element and a clutch ring rotatably locked to the rotatable plate, wherein the cylindrical element or the clutch ring comprises a guiding surface for guiding a roller bearing which is rotationally fixed in position relative to a splined clutch sleeve, wherein the splined clutch sleeve is configured to provide a force on a clutch lever for engaging the magnet armature plate into connection with the electromagnet, and wherein the magnet armature plate is arranged at an opposite end of the clutch lever relative the splined clutch sleeve.

13. The subsea actuator according to claim 12, wherein the actuator further comprises a second biasing element configured to assist in the connection of the first biasing element and the stem by pushing the force transmitting arrangement towards the holding element, wherein the second biasing element is configured to push the clutch lever towards the splined clutch sleeve and thus assist in engagement between the magnet armature plate and the electromagnet.

14. A method of actuating a subsea actuator for actuating a subsea rotating component, the subsea actuator comprising a first biasing element, a motor, a holding element configured to receive an input force, a rotatable stem operatively connectable to the component, a force transmitting arrangement connectable to the first biasing element and the holding element, and a first connection which in a first mode is configured to lock the stem in rotatable engagement with the motor and in a second mode is configured to unlock the stem from rotatable engagement with the motor and allow the stem to be influenced by the first biasing element, the method comprising the steps of:

providing a releasable connection between the first biasing element and the stem via the force transmitting arrangement such that when the first biasing element and the stem are operated to be released from each other, the first biasing element is configured to be pre-tensioned to a position representing a first pre-tensioned position of the actuator without operating the stem;

providing the holding element with a configuration such that the holding element is configured to exert a holding force on the force transmitting arrangement and the first biasing element in the first pre-tensioned position;

when connecting the first biasing element and the stem and pre- tensioning the first biasing element to a first mode of the first connection, operating the motor to operate the stem to a position representing a second pre-tensioned position of the actuator; and providing the holding element with a configuration such that the holding element, upon loss of input force, releases its holding force on the force transmitting arrangement and the first biasing element to unlock the first connection to its second mode, such that the pre-tensioned first biasing element is released and rotates the stem to a position representing a release position of the actuator.

15. The method according to claim 14, wherein the method further comprises operating the motor to pre-tension the first biasing element to the first pre-tensioned position of the actuator.

16. The method according to claim 15, wherein the method further comprises allowing a hydraulic fluid to pre-tension the first biasing element to the first pre-tensioned position of the actuator.

* * * * *